(12) United States Patent
Chang

(10) Patent No.: US 11,241,810 B2
(45) Date of Patent: Feb. 8, 2022

(54) MOLDING MACHINE

(71) Applicants: KYORAKU CO., LTD., Kyoto (JP); SIKA MACHINERY CO., LTD., Taichung (TW)

(72) Inventor: Tzu Chiang Chang, Taichung (TW)

(73) Assignees: KYORAKU CO., LTD., Kyoto (JP); SIKA MACHINERY CO., LTD., Taichung (TW)

( * ) Notice: Subject to any disclaimer, the term of this patent is extended or adjusted under 35 U.S.C. 154(b) by 223 days.

(21) Appl. No.: 16/603,676

(22) PCT Filed: Apr. 19, 2018

(86) PCT No.: PCT/JP2018/016110
§ 371 (c)(1),
(2) Date: Oct. 8, 2019

(87) PCT Pub. No.: WO2018/194121
PCT Pub. Date: Oct. 25, 2018

(65) Prior Publication Data
US 2020/0114560 A1 Apr. 16, 2020

(30) Foreign Application Priority Data

Apr. 19, 2017 (JP) .............................. JP2017-083224
Apr. 19, 2017 (JP) .............................. JP2017-083225

(51) Int. Cl.
*B29C 45/70* (2006.01)
*B29C 45/82* (2006.01)
(52) U.S. Cl.
CPC ............ *B29C 45/706* (2013.01); *B29C 45/82* (2013.01)

(58) Field of Classification Search
CPC ............................. B29C 45/706; B29C 45/82
See application file for complete search history.

(56) References Cited

U.S. PATENT DOCUMENTS

2012/0241012 A1   9/2012  Studer
2015/0042021 A1   2/2015  Schmid
(Continued)

FOREIGN PATENT DOCUMENTS

CN    201026661 Y  *  2/2008
CN    201026661 Y     2/2008
(Continued)

OTHER PUBLICATIONS

The partial supplementary European search report dated Apr. 24, 2020 in corresponding European Application No. 18788423.4; 11 pages.
(Continued)

*Primary Examiner* — Jacob T Minskey
*Assistant Examiner* — Virak Nguon
(74) *Attorney, Agent, or Firm* — Maier & Maier, PLLC

(57) ABSTRACT

A molding machine configured to achieve space saving and simplification of the hydraulic circuit. Provided is a molding machine configured to form a molded body by closing, in a state where a parison is disposed by injecting molten resin between first and second molds capable of being opened and closed, the first and second molds and maintaining pressure applied to the first and second molds. A hydraulic circuit to conduct oil for generating hydraulic pressure; the flow adjustment valve, a pressure adjustment valve, and a path control valve included in the hydraulic circuit; and a multifunctional valve unit.

13 Claims, 23 Drawing Sheets

(56) References Cited

U.S. PATENT DOCUMENTS

| | | | |
|---|---|---|---|
| 2015/0045467 A1 | 2/2015 | Sano et al. | |
| 2015/0132426 A1* | 5/2015 | Yuan | B29C 45/77 425/149 |
| 2016/0207401 A1 | 7/2016 | Kasuya et al. | |
| 2017/0334122 A1* | 11/2017 | Horigome | B29C 49/4236 |
| 2018/0229414 A1* | 8/2018 | Schultz | B29C 45/82 |

FOREIGN PATENT DOCUMENTS

| | | | | |
|---|---|---|---|---|
| CN | 102729440 A | | 10/2012 | |
| CN | 103953602 A | | 7/2014 | |
| EP | 1403528 A1 | | 3/2004 | |
| JP | 60176737 A | * | 9/1985 | B29C 45/82 |
| JP | S60-176737 A | | 9/1985 | |
| JP | H02-34319 A | | 2/1990 | |
| JP | 04320822 A | * | 11/1992 | B29C 45/5008 |
| JP | H04-320822 A | | 11/1992 | |
| JP | H06-055577 A | | 3/1994 | |
| JP | H0655577 A | * | 3/1994 | B29C 45/17 |
| JP | H08-197613 A | | 8/1996 | |
| JP | 2003-021103 A | | 1/2003 | |
| JP | 2006-076229 A | | 3/2006 | |
| JP | 2006076229 A | * | 3/2006 | |
| JP | 2009-226448 A | | 10/2009 | |
| JP | 2009-228706 A | | 10/2009 | |
| JP | 2009228706 A | * | 10/2009 | |
| WO | 2013/111692 A1 | | 8/2013 | |
| WO | 2015-046578 A1 | | 4/2015 | |
| WO | 2016-063989 A1 | | 4/2016 | |

OTHER PUBLICATIONS

Japanese Office Action dated Nov. 17, 2020, in corresponding JP Application No. 2017-083224 (12 pp., including machine-generated English translation).

Japanese Office Action dated Nov. 24, 2020, in corresponding JP Application No. 2017-083225 (14 pp., including machine-generated English translation).

Chinese Office Action dated Apr. 12, 2021, in connection with corresponding CN Application No. 201880025660.1 (13 pp., including machine-generated English translation).

International Search Report dated Jul. 24, 2018 in corresponding International application No. PCT/JP2018/016110; 4 pages.

* cited by examiner

Direction perpendicular to this page: w

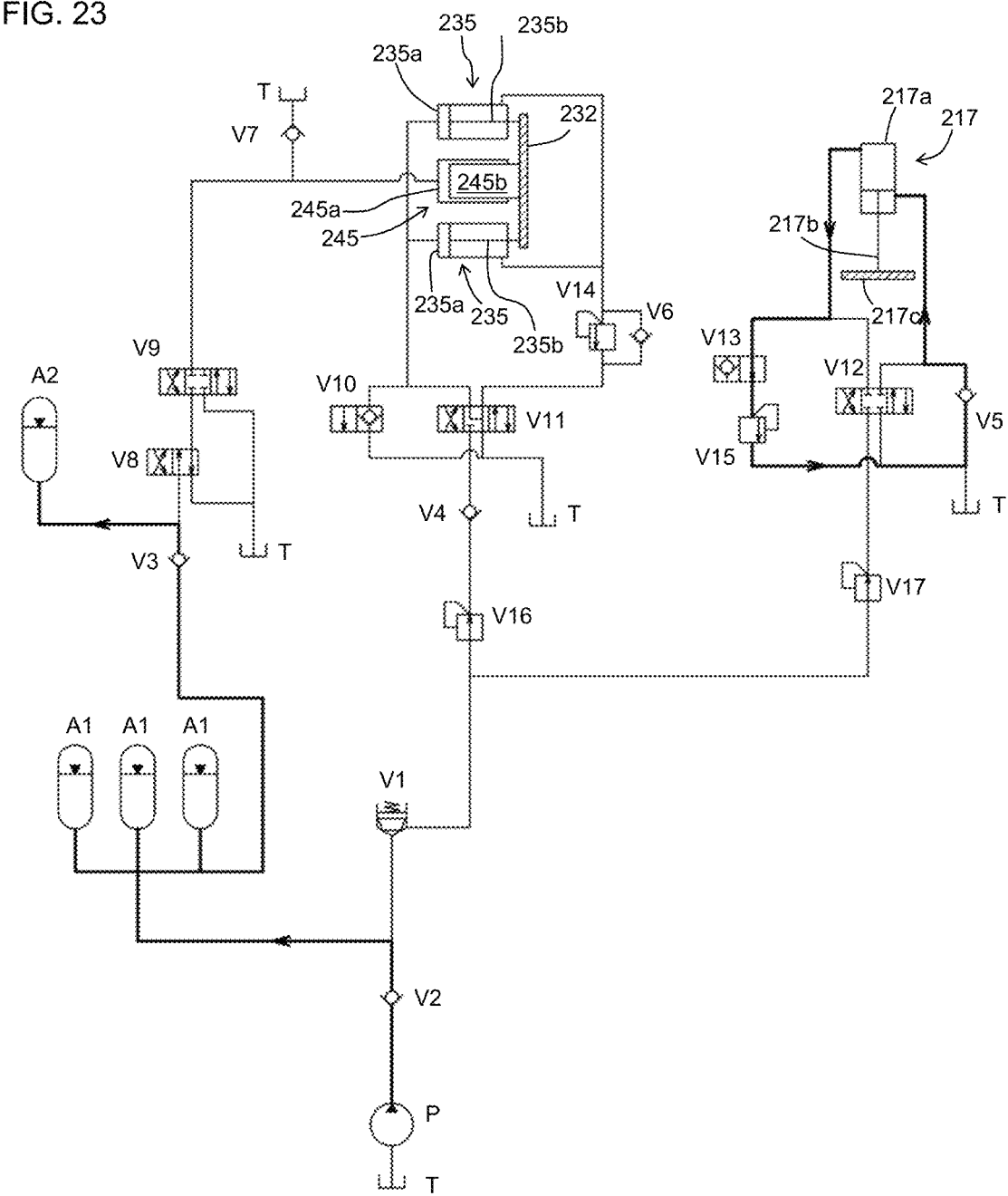

MOLDING MACHINE

TECHNICAL FIELD

The present invention relates to a molding machine.

BACKGROUND (First Viewpoint)

Conventionally, there is known a molding machine configured to form a molded body by injecting resin into a cavity of split molds which can be opened and closed and then closing the split molds to apply and maintain pressure to the split molds in a closed state. In such a molding machine, hydraulic pressure is used as power in a resin injection step, a step of opening and closing the split molds, and a pressure maintenance step. That is, a hydraulic circuit to conduct oil for generating the hydraulic pressure is provided in the molding machine.

(Second Viewpoint)

In foam molding, a foam parison formed by injecting foam molten resin from an injection part is disposed between a pair of split molds, and the split molds are then closed to form a foam molded body (see Patent Literature 1).
[Patent Literature 1] WO2013/111692

SUMMARY (First Viewpoint)

The hydraulic circuit includes a tank for storing oil and a pump for pumping the oil and further includes a flow adjustment valve, a pressure adjustment valve, and a plurality of path control valves. Here, the path control valve is a valve that determines a conduction path of the oil and may be, for example, various types of logic valves or a solenoid valve for operating the logic valves. Generally, an arrangement position in the hydraulic circuit is different for each type of valve. For example, the flow adjustment valve and the pressure adjustment valve are disposed on an upstream side (at positions close to the tank and the pump), and path control valves, such as the solenoid valve and the logic valve, are disposed on a downstream side (at positions close to a hydraulic mechanism to be controlled). Consequently, there arises a problem that the hydraulic circuit takes up space and becomes complicated. In other words, the molding machines according to prior arts tend to be large in overall size.

The first viewpoint of the present invention has been made in view of such circumstances and provides a molding machine configured to achieve space saving and simplification of the hydraulic circuit.

(Second Viewpoint)

Bubbles of the foam molten resin start growing immediately after being injected from the injection part. Therefore, if a duration time from the injection of the foam molten resin by the injection part to the closing of the split molds is long, the bubbles grow excessively and break, resulting in a decrease in an expansion ratio of the foam molded body.

The second viewpoint of the present invention has been made in view of such circumstances and provides a molding machine capable of raising the expansion ratio of the foam molded body.

According to the first viewpoint of the present invention, provided is a molding machine configured to form a molded body by closing, in a state where a parison is disposed by injecting molten resin between first and second molds capable of being opened and closed, the first and second molds and maintaining pressure applied to the first and second molds, comprising: a hydraulic circuit to conduct oil for generating hydraulic pressure; a flow adjustment valve, a pressure adjustment valve, and a path control valve included in the hydraulic circuit; and a multi-functional valve unit, wherein at least hydraulic mechanisms injecting the molten resin, opening and closing the molds, and maintaining the pressure applied to the first and second molds are driven by the hydraulic pressure; the flow adjustment valve adjusts a flow rate of the oil; the pressure adjustment valve adjusts the hydraulic pressure; the path control valve determines a conduction path of the oil in the hydraulic circuit; and the multi-functional valve unit integrally comprises the flow adjustment valve, the pressure adjustment valve, and the path control valve.

The molding machine according to the first viewpoint of the present invention comprises the multi-functional valve unit in the hydraulic circuit and is characterized in that the flow adjustment valve, the pressure adjustment valve, and the path control valve are integrally accommodated in the multi-functional valve unit. The flow adjustment valve and the pressure adjustment valve, and the path control valve, which have been conventionally provided separately, are accommodated integrally, and thus the space saving and simplification of the hydraulic circuit in the molding machine can be achieved. Consequently, the overall size of the molding machine can be reduced.

Hereinafter, various embodiments of the present invention will be exemplified. The embodiments shown hereinafter can be combined with each other.

Preferably, the molding machine further comprises a pump, wherein the pump is configured to suck out the oil from a tank for storing the oil and conduct the oil to a downstream side; the pump, the multi-functional valve unit, and the hydraulic mechanisms are arranged from an upstream side to a downstream side in the hydraulic circuit; and La>Lb, where La is an average value of path lengths between the multi-functional valve unit and the hydraulic mechanisms in the hydraulic circuit, and Lb is a path length between the pump and the multi-functional valve unit in the hydraulic circuit.

Preferably, the multi-functional valve unit has a substantially rectangular parallelepiped shape; the flow adjustment valve, the pressure adjustment valve, and the path control valve are provided on a surface of the substantially rectangular parallelepiped.

Preferably, a plurality of channels in the multi-functional valve unit is provided so as to extend from a surface of the substantially rectangular parallelepiped along a direction perpendicular to the surface.

Preferably, the molding machine is configured to have two stages and comprises a resin supply device for injecting the resin, wherein the resin supply device comprises an extruder for melting and kneading raw resin into molten resin; the first and second molds and the multi-functional valve unit are provided in a lower stage; the resin supply device is provided in an upper stage; the first and second molds and the multi-functional valve unit are disposed along a longitudinal direction of the extruder; and the first and second molds are opened and closed along the longitudinal direction of the extruder.

According to the second viewpoint of the present invention, provided is a molding machine comprising: a hydraulic circuit; a hydraulic mechanism for injection; a hydraulic mechanism for opening and closing; an injection part; and first and second platens on which first and second molds are mounted, wherein the hydraulic circuit conducts oil for generating hydraulic pressure; the hydraulic mechanism for injection and the hydraulic mechanism for opening and closing are driven by hydraulic pressure; the injection part is driven by the hydraulic mechanism for injection to inject molten resin between the first and second molds to form a parison; the first and second platens are configured to be driven by the hydraulic mechanism for opening and closing and open and close the first and second molds; the hydraulic circuit comprises a first accumulator for accumulating oil; and the hydraulic mechanism for injection and the hydraulic mechanism for opening and closing are sequentially driven by hydraulic pressure generated by the oil discharged from the first accumulator.

In the molding machine of the present invention, the hydraulic mechanism for injection and the hydraulic mechanism for opening and closing are sequentially driven by the hydraulic pressure generated by the oil discharged from the first accumulator. This makes it possible to perform injection and mold closing at high speed, and thus bubble breakage can be prevented, and the expansion ratio of the foam molded body can be increased.

Hereinafter, various embodiments of the present invention will be exemplified. The embodiments shown hereinafter can be combined with each other.

Preferably, the first accumulator is divided into a plurality of parts.

Preferably, the molding machine comprises a hydraulic mechanism for pressure maintenance, wherein the hydraulic mechanism for pressure maintenance is driven by hydraulic pressure; the hydraulic mechanism for pressure maintenance is configured to maintain pressure applied to the first and second molds in a closed state; the hydraulic circuit comprises a second accumulator for storing oil; and the hydraulic mechanism for pressure maintenance is driven by hydraulic pressure generated by the oil discharged from the second accumulator.

Preferably, the hydraulic pressure generated by the oil discharged from the second accumulator does not drive the hydraulic mechanism for opening and closing and the hydraulic mechanism for injection.

Preferably, the molding machine comprises a back-pressure adjustment valve for adjusting back pressure in the hydraulic mechanism for injection when molten resin is injected into the injection part.

Preferably, the molding machine comprises an extruder for melting raw resin into molten resin, wherein the first accumulator is disposed below the extruder and on a back side of the hydraulic mechanism for opening and closing.

Further, according to another viewpoint derived from the second viewpoint of the present invention, provided is a method for manufacturing a foam molded body by means of the afore-mentioned molding machine, comprising: an injection step of injecting, by being driven by the hydraulic mechanism for injection, a foam molten resin between the first and second molds to form a foam parison; and a mold closing step of closing the first and second molds by being driven by the hydraulic mechanism for opening and closing, wherein the hydraulic mechanism for injection and the hydraulic mechanism for opening and closing are sequentially driven by hydraulic pressure generated by the oil discharged from the first accumulator.

Preferably, the method comprises a pressure maintenance step of maintaining pressure applied to the first and second molds in a closed state by a hydraulic mechanism for pressure maintenance, wherein the hydraulic mechanism for pressure maintenance is driven by hydraulic pressure generated by oil discharged from a second accumulator.

BRIEF DESCRIPTION OF DRAWINGS

FIG. 2A shows molds 21, 22 in an opened state, and FIG. 2B shows the molds 21, 22 in a closed state (the same applies when pressure is applied and maintained).

FIG. 23 is a schematic view of the main part of the hydraulic circuit C and shows the oil conduction path when the molten resin is injected to the injection part 218.

DETAILED DESCRIPTION

Hereinafter, embodiments of the present invention will be described. Various characteristics shown in the embodiments described below can be combined with each other. Further, the invention is independently established for each characteristic. The first and second embodiments are particularly related to the inventions of the first and second viewpoints, respectively.

1. First Embodiment

First, the first embodiment of the present invention will be described.

1.1 Overall Configuration

Figure 1:
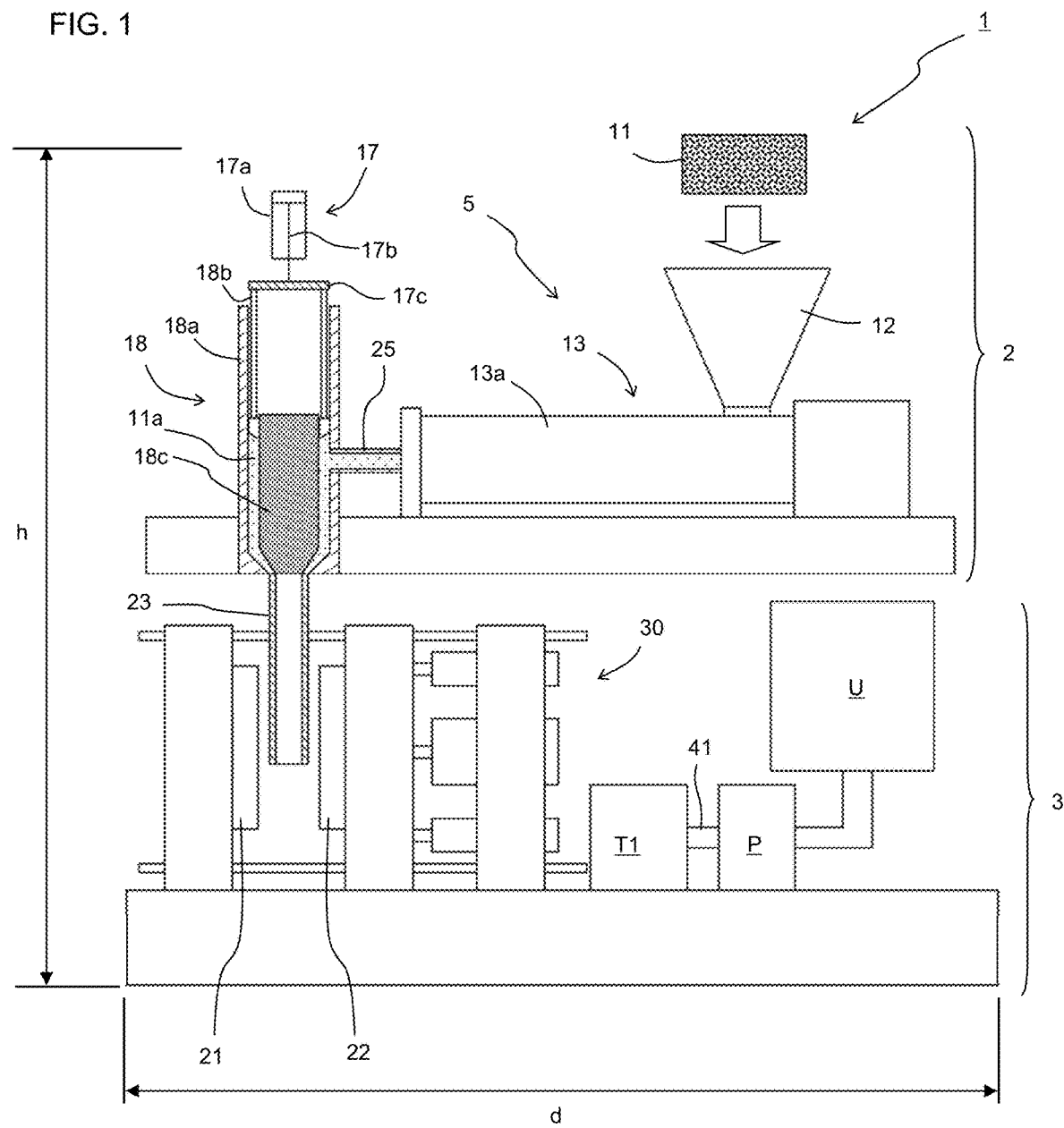
FIG. 1 is a side schematic view of a molding machine 1 according to a first embodiment of the present invention.

First, a molding machine according to the first embodiment of the present invention will be described. FIG. 1 is a side schematic view of a molding machine 1 according to the first embodiment of the present invention. As shown here, the molding machine 1 has a substantially rectangular parallelepiped shape as a whole, and a depth d is longer than a width w. Further, the molding machine 1 is configured to have two stages including an upper stage 2 and a lower stage 3. The configuration of the upper stage 2 and the lower stage is described in detail below.

1.1.1 Configuration of Upper Stage 2

The configuration of the upper stage 2 is described. The upper stage 2 includes a resin supply device 5 and an injection part 18. The resin supply device 5 comprises a hopper 12 and an extruder 13. The extruder 13 is connected to the injection part 18 via a connecting pipe 25.

<Hopper 12, Extruder 13>

The hopper 12 is used for charging raw resin 11 in a cylinder 13a of the extruder 13. Although the form of the raw resin 11 is not specifically limited, pellet-shaped resin is usually used. The raw resin 11 is, for example, a thermoplastic resin such as polyolefin. Examples of the polyolefin include low-density polyethylene, linear low-density polyethylene, high-density polyethylene, polypropylene, ethylene-propylene copolymer, and a mixture thereof. The raw resin 11 is charged in the cylinder 13a from the hopper 12 and then melted and kneaded into molten resin by being heated in the cylinder 13a. Further, the raw resin 11 is conveyed toward a front end of the cylinder 13a by rotation of a screw disposed in the cylinder 13a. The screw is disposed in the cylinder 13a and kneads and conveys the molten resin by rotation. A gear device is provided at a base end of the screw, and the screw is driven by the gear device to rotate. The number of the screws disposed in the cylinder 13a may be one or more.

<Hydraulic Mechanism for Injection 17, Injection Part 18>

The molten resin 11a is extruded from a resin extrusion port of the cylinder 13a and injected into the injection part 18 via the connecting pipe 25. The injection part 18 comprises a cylinder 18a, a piston 18b slidable therein, and a mandrel 18c, and the cylinder 18a is configured to store the molten resin 11a inside. By moving the piston 18b after a predetermined amount of the molten resin 11a is stored in the cylinder 18a, the molten resin 11a is injected downward from a die slit provided at a tip of the injection part 18 to form a parison 23. The parison 23 has a cylindrical shape in FIG. 1, but is not limited to this example, and may have another shape (for example, a sheet shape).

One end of the piston 18b is connected to a hydraulic mechanism for injection 17. The hydraulic mechanism 17 comprises a cylinder 17a and a piston 17b slidable therein. The piston 17b is connected to the piston 18b via a connecting plate 17c. The piston 17b can be driven by controlling hydraulic pressure in the cylinder 17a. A hydraulic circuit for driving the piston 17b will be described later.

1.1.2 Configuration of Lower Stage 3

Figure 2A:
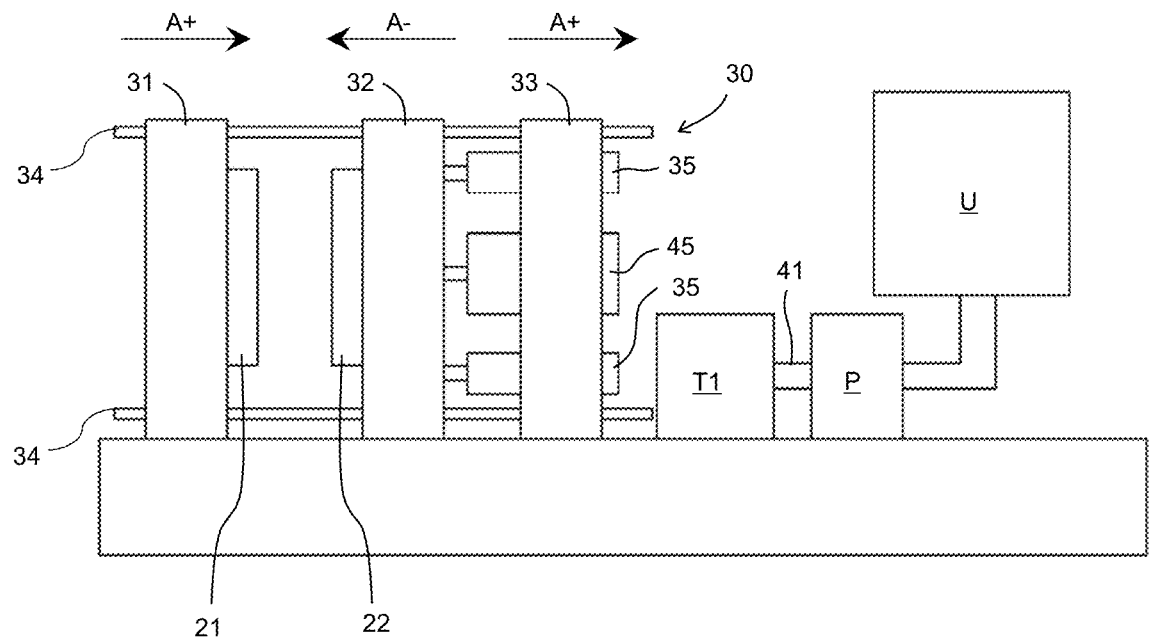
FIG. 2A and FIG. 2B are a conceptual diagram showing a configuration of a lower stage 3 of the molding machine 1 according to the first embodiment of the present invention. Specifically.
Figure 2B:
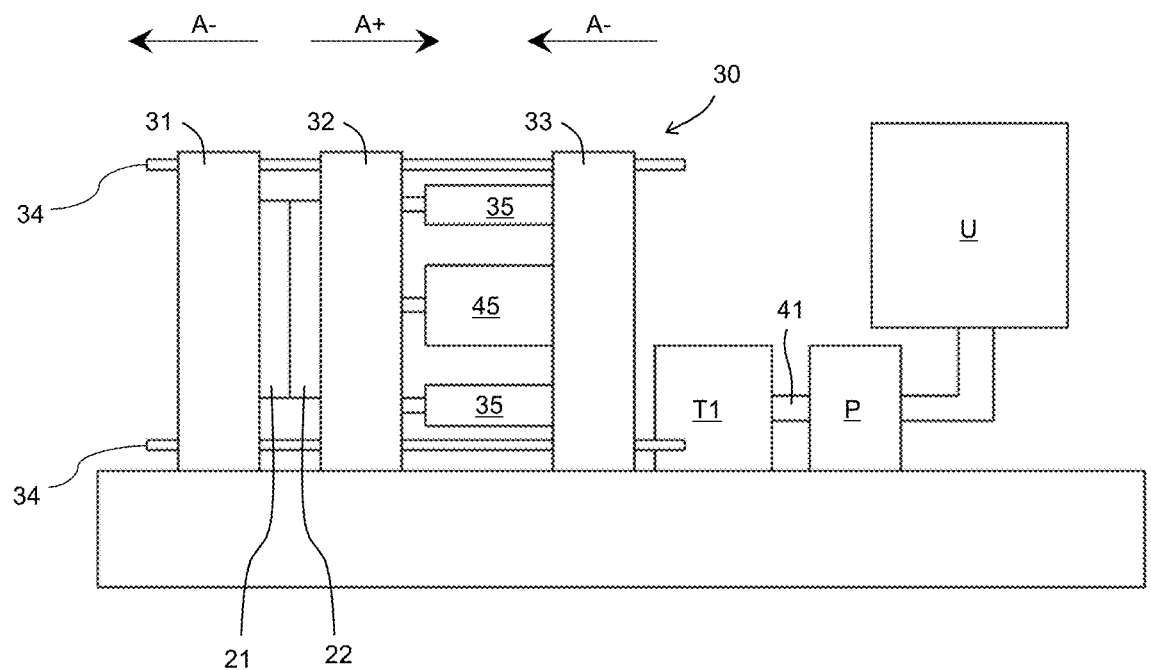

The configuration of the lower stage 3 is described. FIG. 2A and FIG. 2B are conceptual diagrams showing the configuration of the lower stage 3 of the molding machine 1 according to the first embodiment of the present invention. The lower stage 3 includes a first mold 21, a second mold 22, and a mold opening/closing and pressure maintenance device 30 to open and close the molds and maintain pressure, as well as a tank T1, a pump P, and a multi-functional valve unit U which are related to the hydraulic circuit described later. The molds 21, 22 and the multi-functional valve unit U are disposed along a longitudinal direction of the extruder 13.

<First and Second Molds 21, 22>

Split molds comprising the molds 21, 22 are configured to be opened and closed in a direction of the depth d (the longitudinal direction of the extruder 13). The configuration for opening and closing will be described in detail in the description of the mold opening/closing and pressure maintenance device 30. As shown in FIG. 1 and FIG. 2, a molded body can be formed by closing, in a state the parison 23 is disposed between the molds 21, 22, the molds 21, 22 and maintaining pressure applied to the molds 21, 22. A molding method using the molds 21, 22 is not specifically limited, may be blow molding in which air is blown into a cavity of the molds 21, 22 to perform molding, may be vacuum molding in which the inside of the cavity of the molds 21, 22 is decompressed to form a parison, or may be a combination thereof. When the molten resin contains a foaming agent, the parison becomes a foam parison.

<Mold Opening/Closing and Pressure Maintenance Device 30>

As shown in FIGS. 2A and 2B, the mold opening/closing and pressure maintenance device 30 comprises first and second mold plates 31, 32, a pressure receiving plate 33, a tie bar 34, a hydraulic mechanism for mold opening and closing 35, and a hydraulic mechanism for pressure maintenance 45. In the first embodiment, the hydraulic mechanism 35 comprises a pair of hydraulic pressure cylinder mechanisms. The hydraulic mechanism 45 comprises one hydraulic pressure cylinder mechanism.

The first mold plate 31 comprises the first mold 21 on a rear surface. The second mold plate 32 faces the first mold plate 31 on a front side. The second mold plate 32 comprises the second mold 22. The second mold 22 is held so as to face the first mold 21. The pressure receiving plate 33 is provided on a side opposite to the first mold plate 31 when viewed from the second mold plate 32. The tie bar 34 extends through the first mold plate 31, the second mold plate 32, and the pressure receiving plate 33. The hydraulic mechanisms 35, 45 are provided between the second mold plate 32 and the pressure receiving plate 33.

The hydraulic mechanisms 35, 45 respectively comprises a cylinder and a piston slidable therein. The piston is configured to be slid by controlling hydraulic pressure in the cylinder. Specifically, the protruding amount of the piston in the direction of the depth d is controlled by hydraulic pressure of oil conducted in the hydraulic circuit described later. The hydraulic mechanism 35 is used for opening and closing the molds 21, 22. The hydraulic mechanism 45 is used for maintaining the pressure applied to the molds 21, 22.

For example, when the cylinder in the hydraulic mechanism 35 is extended, the first mold plate 31 and the pressure receiving plate 33 fixed to the tie bar 34 are slid together with the tie bar 34 in a direction of an arrow A+ in FIG. 2A, and the second mold plate 32 through which the tie bar 34 passed is slid in a direction of an arrow A− in FIG. 2A. As a result, the molds 21, 22 provided on the mold plates 31, 32 shift from a mold opening state (FIG. 2A) to a mold closing state (FIG. 2B). Further, from the state of FIG. 2B, the hydraulic mechanism 45 further applies pressure in a closing direction to maintain the pressure applied to the molds 21, 22. Similarly, when the cylinder in the hydraulic mechanism 35 is contracted, the first mold plate 31 and the pressure receiving plate 33 fixed to the tie bar 34 are slid together in the direction of the arrow A− in FIG. 2B, and the second mold plate 32 through which the tie bar 34 passed is slid in the direction of the arrow A+ in FIG. 2B. As a result, the molds 21, 22 provided on the mold plates 31, 32 shift from the mold closing state (FIG. 2B) to the mold opening state (FIG. 2A).

<Tank T1, Pump P, Multi-Functional Valve Unit U>

The oil conducted in the hydraulic circuit is stored in the tank T1. The pump P is connected to the tank T1 via a pipe 41 and sucks out the oil from the tank T1 and sends the oil to a downstream side where the multi-functional valve unit U is positioned. The multi-functional valve unit U comprises a plurality of pipes and a plurality of valves, and specifically, a flow adjustment valve, a pressure adjustment valve, and a path control valve are all accommodated therein as one unit. The flow adjustment valve has, for example, a constriction shape so that a cross-sectional area of a path can be reduced to adjust a flow rate of the oil conducted in the hydraulic circuit. The pressure adjustment valve is configured to allow a part of the oil conducted in the hydraulic circuit to escape to another path, thereby adjusting the hydraulic pressure. The path control valve is, for example, a solenoid valve and the like configured to switch circuits by electric operation, and a plurality of such path control valves are provided in the multi-functional valve unit U. By switching the hydraulic circuits, the hydraulic mechanism for injection 17 used for the resin injection, the hydraulic mechanism for mold opening and closing 35 used to open and close the molds 21, 22, and the hydraulic mechanism for pressure maintenance 45 used for pressure maintenance are controlled. In this regard, while cylinder mechanisms are employed in all the mechanisms, this is merely an example, and another actuator (driving mechanism) may be employed.

1.2 Hydraulic Circuit

Next, the oil conduction path in the hydraulic circuit is described for a purpose of each step. The hydraulic circuit is a circuit that conducts the oil generating hydraulic pressure.

Figure 3:
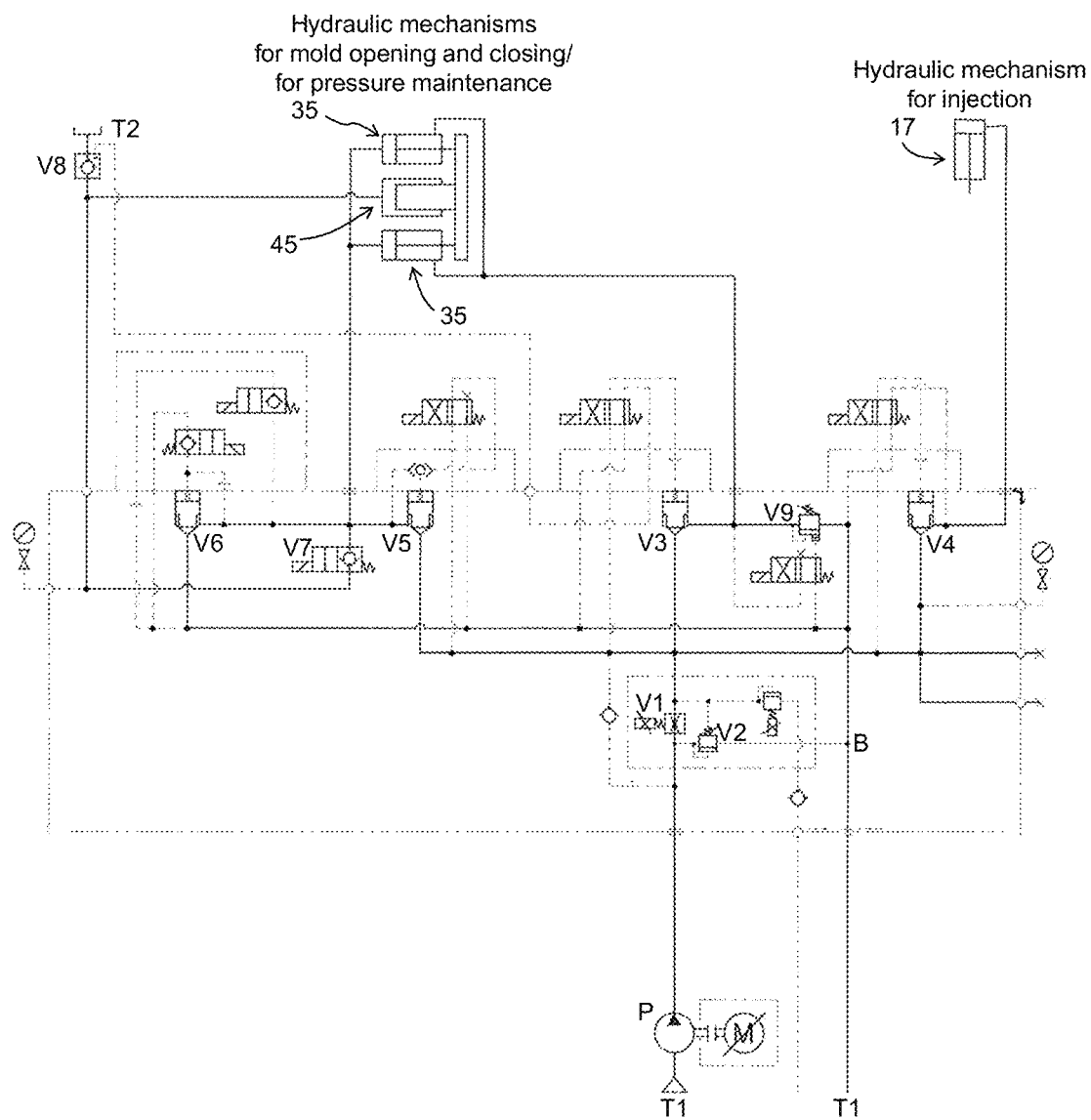
FIG. 3 is an overall circuit diagram of a hydraulic circuit according to the first embodiment of the present invention.

FIG. 3 is an overall circuit diagram of a hydraulic circuit according to the first embodiment of the present invention. As shown in FIG. 3, the hydraulic circuit comprises a main channel for conducting the oil to apply pressure to a piston portion in each hydraulic mechanism, and a pilot channel branched from the main channel. The pilot channel is provided with a solenoid valve, and operation of a logic valve or the like provided in the main channel is controlled by controlling the conduction path of the oil conducted in the pilot channel. That is, the oil conduction path in the main channel is thus determined. The description below is made, in consideration of visibility, with reference to diagrams (FIG. 4 to FIG. 8) of the main circuit as a part of the hydraulic circuit.

Figure 4:
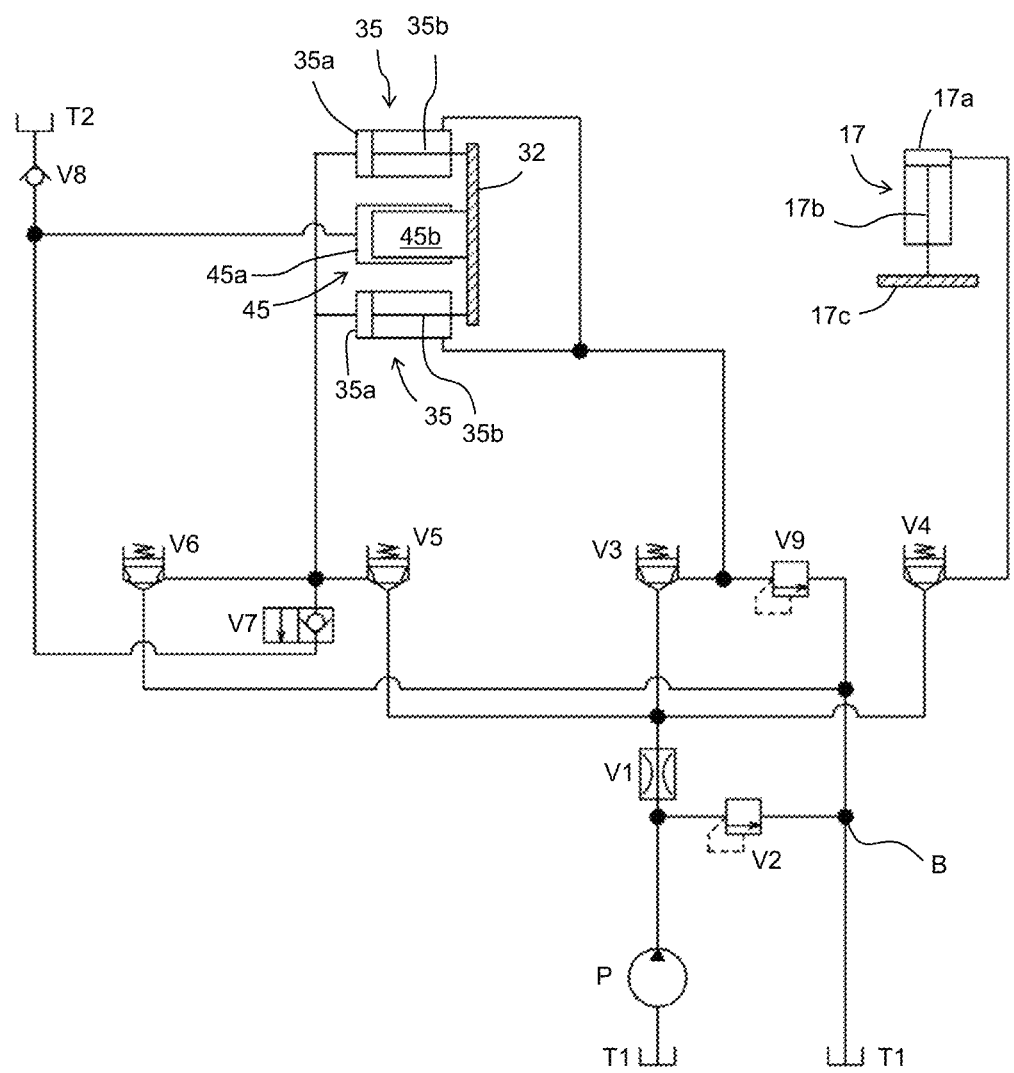
FIG. 4 is a schematic view of the main part of the hydraulic circuit.

FIG. 4 is a schematic view of the main part of the hydraulic circuit. The tank T1 is built in the molding machine 1, and the oil conducted in the hydraulic circuit in each step is stored therein. A tank T2 is externally connected to the molding machine 1 and stores additional oil used in a mold closing step described later. In this regard, the tank T1 and the tank T2 are separate components in FIG. 4 but may be connected with each other by a channel (not shown).

1.2.1 Valves

<Flow Adjustment Valve V1>

A flow adjustment valve V1 has, for example, a constriction shape, so that a cross-sectional area of a path can be reduced to adjust a flow rate of the oil conducted in the hydraulic circuit.

<Pressure Adjustment Valve V2>

A pressure adjustment valve V2 is configured to allow a part of the oil conducted in the hydraulic circuit to escape to another path, thereby adjusting the hydraulic pressure.

<Path Control Valves V3-V9>

Path control valves V3-V6 are logic valves V3-V6 for controlling oil conduction by opening and closing to determine a conduction path. A path control valve V7 is a solenoid valve V7 configured to control the conduction of oil at the position thereof. A path control valve V8 is a prefill valve V8 configured to suck a large amount of oil from the tank T2 toward the hydraulic mechanism 45 as appropriate and to prevent a backflow from the hydraulic mechanism 45 to the tank T2. A path control valve V9 is a relief valve V9 configured to be opened to release pressure when pressure exceeding a set value is applied. Among the path control valves V3-V9, the logic valves V3-V6, the prefill valve V8, and the relief valve V9 are connected to the pilot channel (see FIG. 3, not shown in FIG. 4-FIG. 8), and the operation thereof is respectively controlled by a corresponding solenoid valve.

1.2.2 Conduction Path

<Extrusion Step of Molten Resin 11a>

Figure 5:
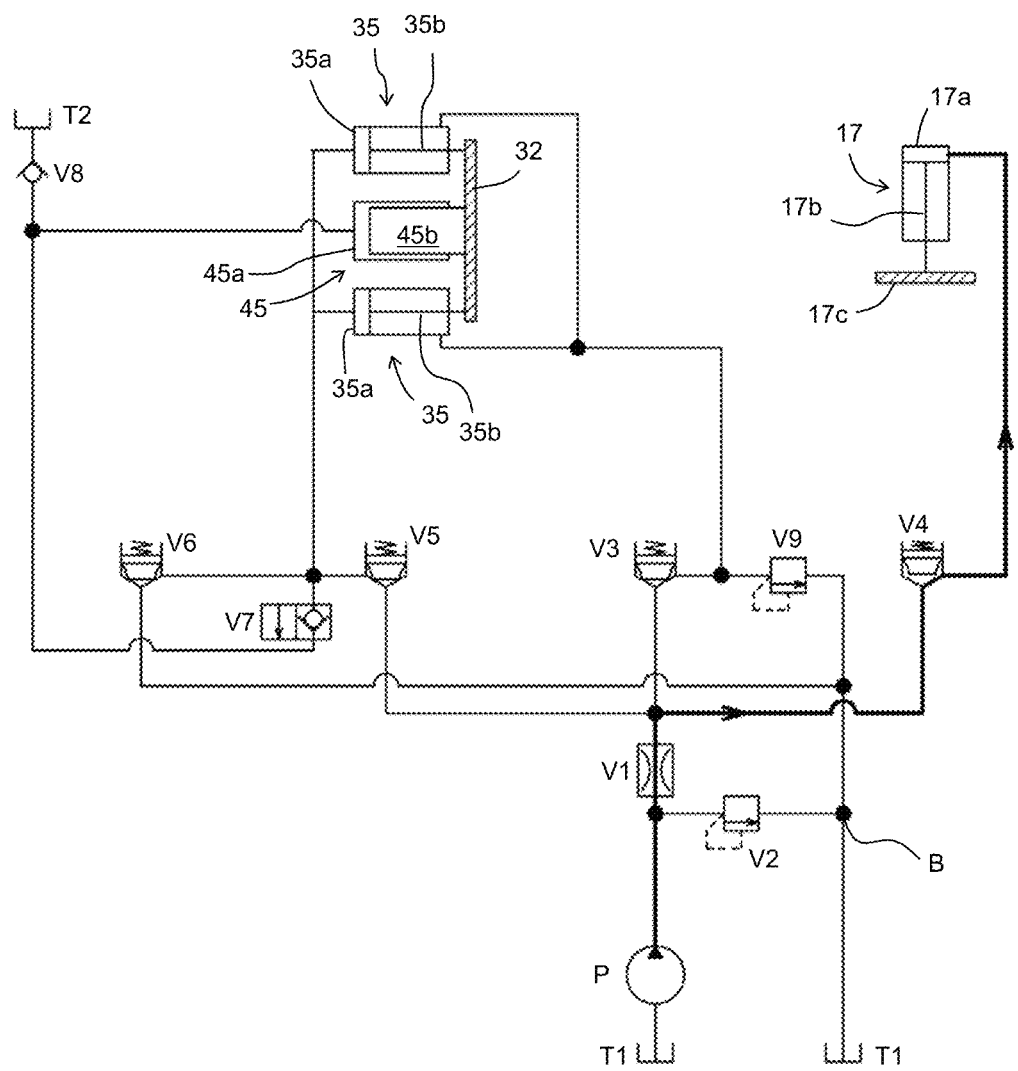
FIG. 5 shows an oil conduction path in the hydraulic circuit when molten resin 11a is injected in FIG. 4.

FIG. 5 shows the oil conduction path in the hydraulic circuit when the molten resin 11a is injected in FIG. 4. Here, an oil flow avoided from the main channel for pressure reduction by the pressure adjustment valve V2 is omitted from the drawing. The same applies to the subsequent drawings. When the molten resin 11a is injected, a solenoid valve (not shown) is controlled so that the logic valves V3, V5 and the prefill valve V8 are closed, and the logic valve V4 is opened. Under such a condition, the pump P sends the oil stored in the tank T1 to the downstream side. A flow rate of the supplied oil is adjusted by passing through the flow adjustment valve V1. The oil is then injected in the cylinder 17a of the hydraulic mechanism 17 through the logic valve V4 in an opened state and pushes down the piston 17b. The molten resin 11a is injected through such a step, and, as shown in FIG. 1, the parison 23 is formed by extruding downward the molten resin 11a from a die slit provided in the injection part 18. Further, when the extruder 13 is operated to inject the molten resin 11a into the injection part 18, the piston 17b is pushed up by the pressure of the molten resin 11a, and the oil in the cylinder 17a is pushed out. This oil passes through the pilot channel (not shown), is conducted to a return position B shown in FIG. 4, and is then returned to the tank T1.

<Mold Closing Step of Molds 21, 22>

Figure 6:
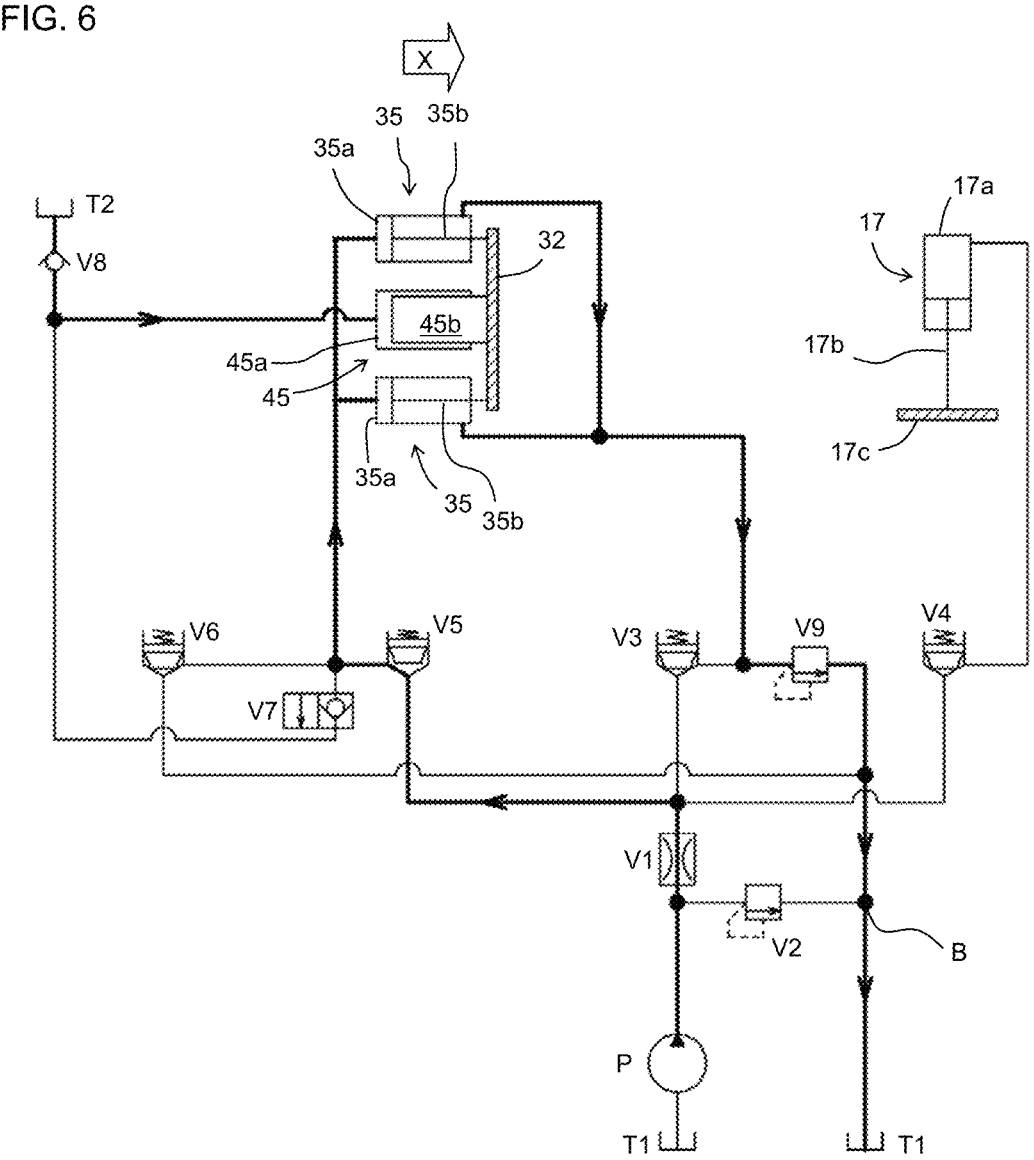
FIG. 6 shows the oil conduction path in the hydraulic circuit when the molds 21, 22 are closed in FIG. 4.
Figure 7:
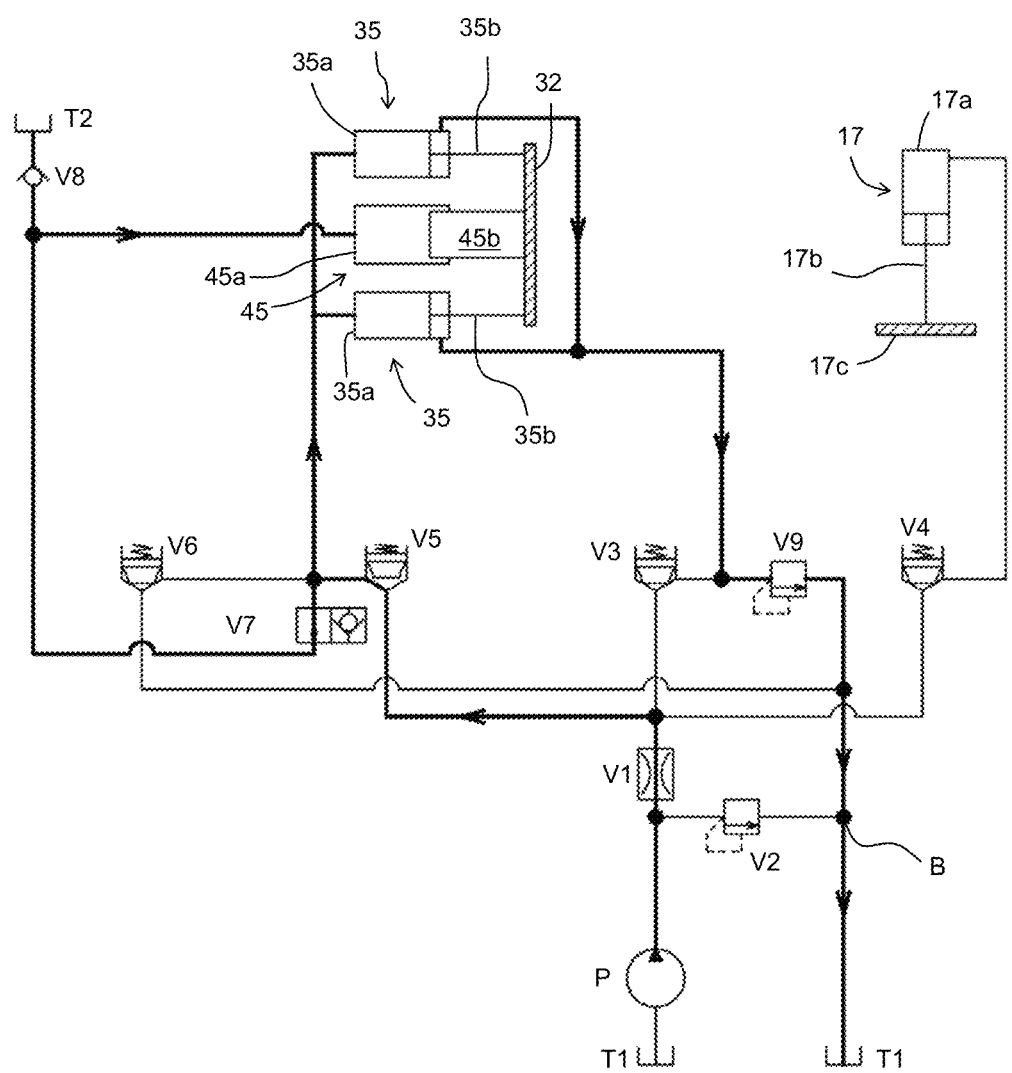
FIG. 7 shows the oil conduction path in the hydraulic circuit when pressure applied to the molds 21, 22 is maintained (mold clamping) in FIG. 4.

FIG. 6 shows the oil conduction path in the hydraulic circuit when the molds 21, 22 are closed in FIG. 4. When the molds 21, 22 are closed, at least the logic valve V5 is shifted to an opened state, and the logic valve V4 is shifted to a closed state from the state of FIG. 5. More specifically, a solenoid valve (not shown) is controlled to close the logic valves V3, V4, V6 and open the logic valve V5. In addition, the solenoid valve V7 is closed. In this regard, strictly speaking, the closed state of the solenoid valve V7 is a state where conduction from an upstream side to a downstream side of the solenoid valve V7 is restricted as shown in FIG. 7. Under such a condition, the pump P sends the oil stored in the Tank T1 to the downstream side. A flow rate of the supplied oil is adjusted by passing through the flow adjustment valve V1. The oil is then injected into a cylinder 35a of the hydraulic mechanism 35 through the logic valve V5 in an opened state and moves a piston 35a in a mold closing direction (a direction of an arrow X) of the molds 21, 22. In this way, the molds 21, 22 are closed. When the molds are closed, the oil located on a right side of the hydraulic mechanism 35 in FIG. 6 is pushed out and returned to the tank T1 through the relief valve V9.

A cylinder 45a of the hydraulic mechanism 45 is connected to the tank T2 via the prefill valve V8. When the mold plate 32 is moved in the direction of the arrow X with the movement of the piston 35a, a piston 45a is also moved in the direction of the arrow X. Along with this movement, oil from the tank T2 is sucked into the cylinder 45a. The cylinder 45a of the hydraulic mechanism 45 has a large capacity. Therefore, if the hydraulic mechanism 45 is configured so that oil from the pump P is injected into the cylinder 45a, it is necessary to use the pump capable of outputting a large capacity, and thus the pump P becomes large. On the other hand, in the first embodiment, the oil from the tank T2 is passively injected into the cylinder 45a with the movement of the piston 35a, and thus an increase in the size of the pump P can be avoided.

<Pressure Maintenance Step of Molds 21, 22>

In addition to the mold closing step of the molds 21, 22, a step is performed to further apply and maintain pressure to the molds 21, 22 in the closing direction. This step is referred to as a pressure maintenance. The pressure maintenance step may be started in the middle of the mold closing step or may be performed after the mold closing step is completed. FIG. 7 shows the oil conduction path in the hydraulic circuit when pressure applied to the molds 21, 22 is maintained in FIG. 4. Here, FIG. 7 shows the oil conduction path when the pressure maintenance step is additionally performed in the middle of the mold closing step, but in actuality, when the molds 21, 22 are brought into contact with each other and the mold closing step is completed, the pressure is applied to the molds 21, 22 while oil flow itself stops. In other words, the oil hardly flows in such a state, and the hydraulic pressure is applied to the piston 45a. When the pressure applied to the molds 21, 22 is maintained, at least the solenoid valve V7 is shifted to the opened state from the state of FIG. 6. More specifically, a solenoid valve (not shown) is controlled to close the logic valves V3, V4, V6 and open the logic valve V5. In addition, the solenoid valve V7 is shifted to the opened state. Under such a condition, the pump P sends the oil stored in the Tank T1 to the downstream side. A flow rate of the supplied oil is adjusted by passing through the flow adjustment valve V1. The oil then passes through the logic valve V5 and the solenoid valve V7 in the opened state and applies pressure to the cylinder 45a of the hydraulic mechanism 45 in the direction of the arrow X to maintain the pressure applied to the molds 21, 22.

<Mold Opening Step of Molds 21, 22>

Figure 8:
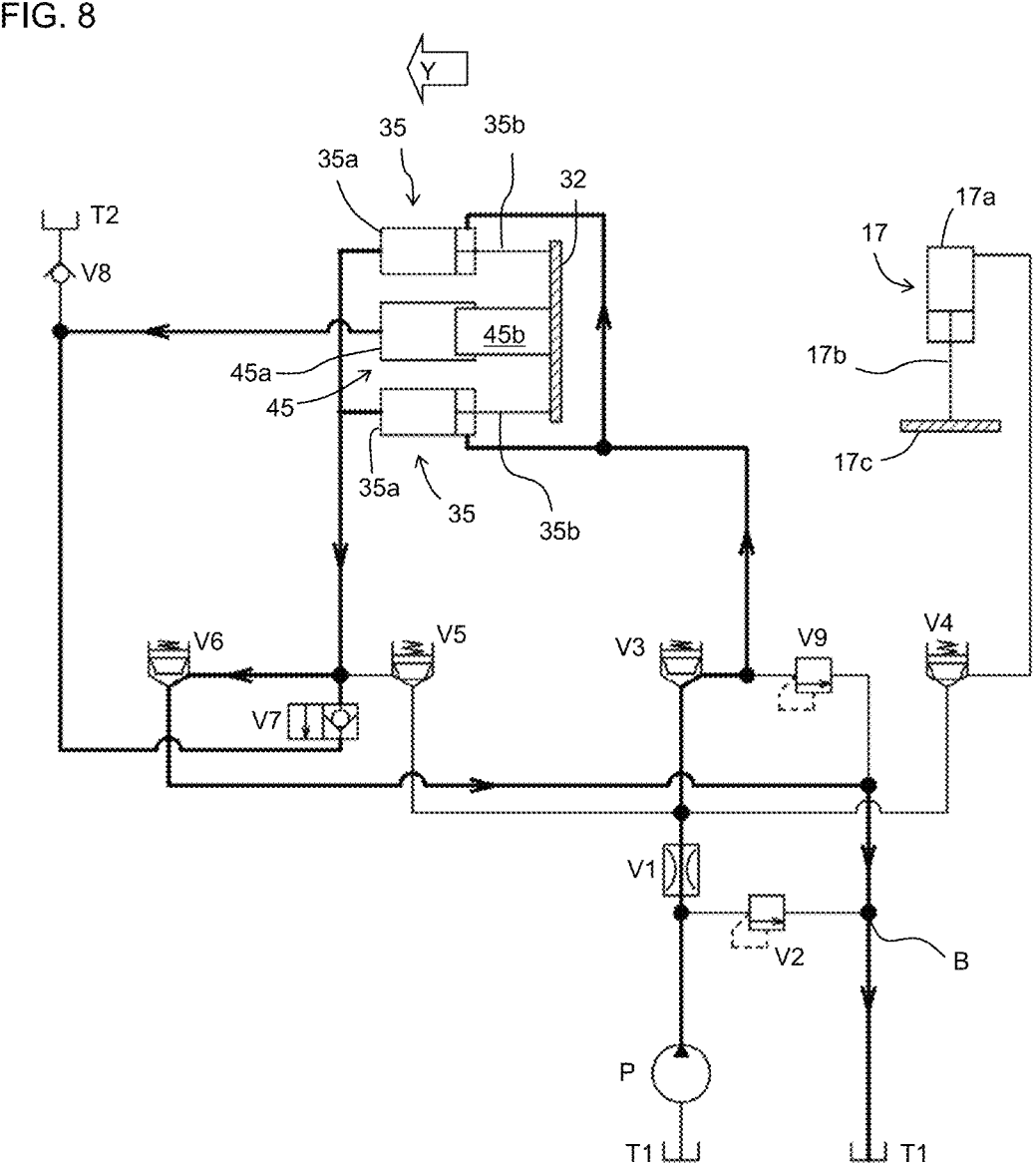
FIG. 8 shows the oil conduction path in the hydraulic circuit when the molds 21, 22 are opened in FIG. 4.

FIG. 8 shows the oil conduction path in the hydraulic circuit when the molds 21, 22 are opened in FIG. 4. When the molds 21, 22 are opened, at least the logic valve V5 and the solenoid valve V7 are shifted to the closed state from the state of FIG. 9, and the logic valves V3, V6 are shifted to the opened state. More specifically, a solenoid valve (not shown) is controlled to close the logic valve V5 and open the logic valves V3, V6. In addition, the solenoid valve V7 is closed. Under such a condition, the pump P sends the oil stored in the Tank T1 to the downstream side. A flow rate of the supplied oil is adjusted by passing through the flow adjustment valve V1. The oil then passes through the logic valve V3 in the opened state and applies pressure to the piston 35a of the hydraulic mechanism 35 in a direction of an arrow Y in FIG. 8. In this way, the molds 21, 22 are opened. When the molds are opened, the oil located on a left side of the piston 35b in the cylinder 35a is pushed out and returned to the tank T1 through the logic valve V6. Further, when the molds are opened, the oil in the cylinder 45a is pushed out and returned to the tank T1 through the solenoid valve V7 and the logic valve V6.

1.3 Multi-Functional Valve Unit

Figure 9:
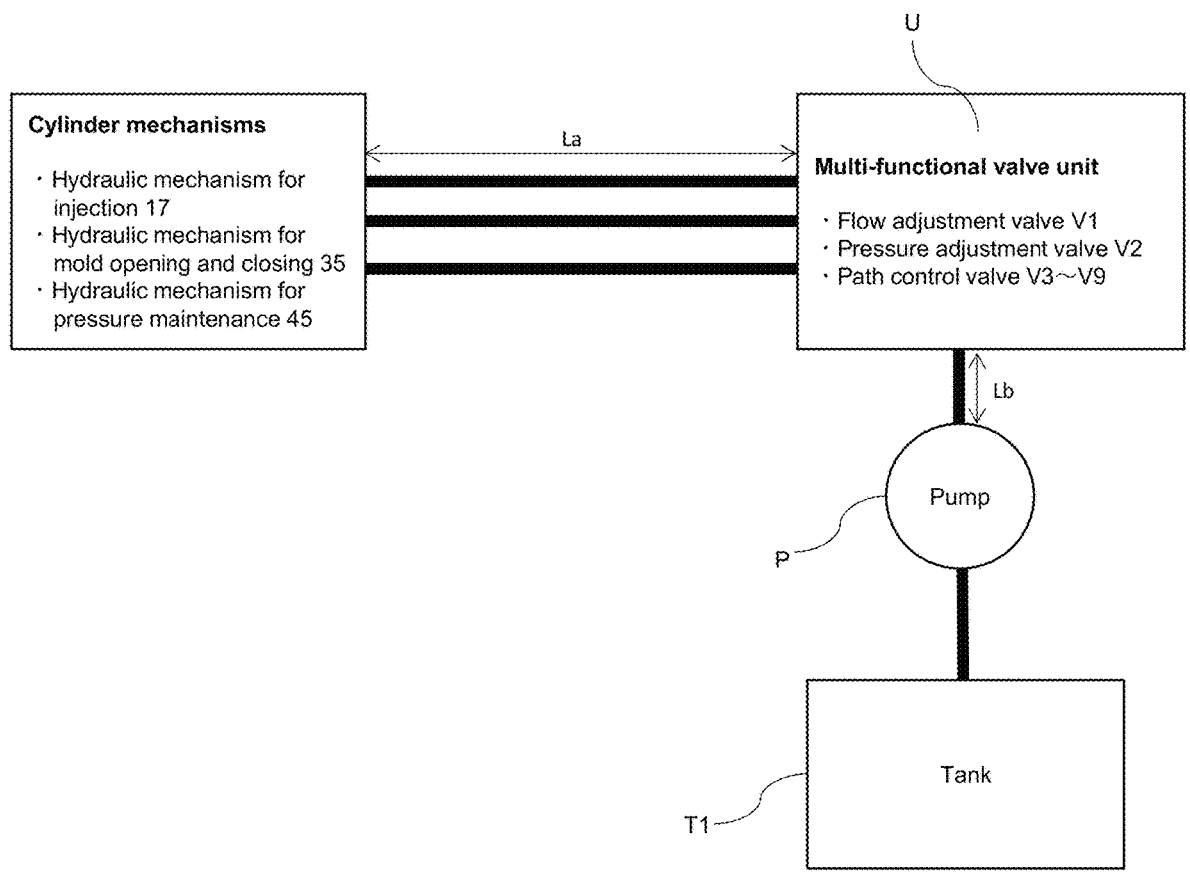
FIG. 9 is a block diagram showing features of a multi-functional valve unit U according to the first embodiment of the present invention.

Next, the multi-functional valve unit U is described. FIG. 9 is a block diagram showing features of a multi-functional valve unit U according to the first embodiment of the present invention. The multi-functional valve unit U comprises the flow adjustment valve V1, the pressure adjustment valve V2, and the path control valves V3-V9, which are described above, as well as pipes for connecting these valves. In the hydraulic circuit, the pump P, the multi-functional valve unit U, and the hydraulic mechanisms 17, 35, 45 are arranged from the upstream side to the downstream side.

As shown in FIG. 9, the configuration according to the first embodiment satisfies La>Lb, where La is an average value of path lengths between the multi-functional valve unit U and each of the hydraulic mechanisms (the hydraulic mechanism 17, 35, 45), Lb is a path length between the multi-functional valve unit U and the pump P. Since pressure between the multi-functional valve unit U and the pump P is high, damage to the pipes can be suppressed by shortening a distance therebetween. The value of La/Lb may be, for example, 2 to 100, specifically, for example, 2, 3, 5, 10, 20, 30, 40, 50, 60, 70, 80, 90, 100, and may be within a range between any two of the exemplified values.

Figure 10A:
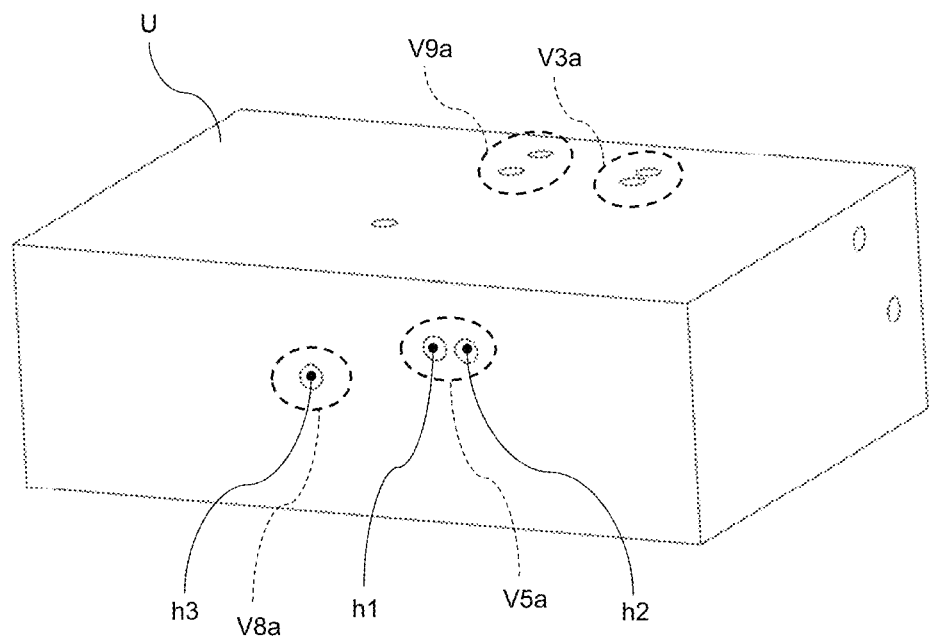
FIG. 10A and FIG. 10B are perspective views of the multi-functional valve unit U (excluding valves thereof) according to the first embodiment of the present invention. Particularly, in FIG. 10B, the inside is shown in a transparent manner.
Figure 10B:
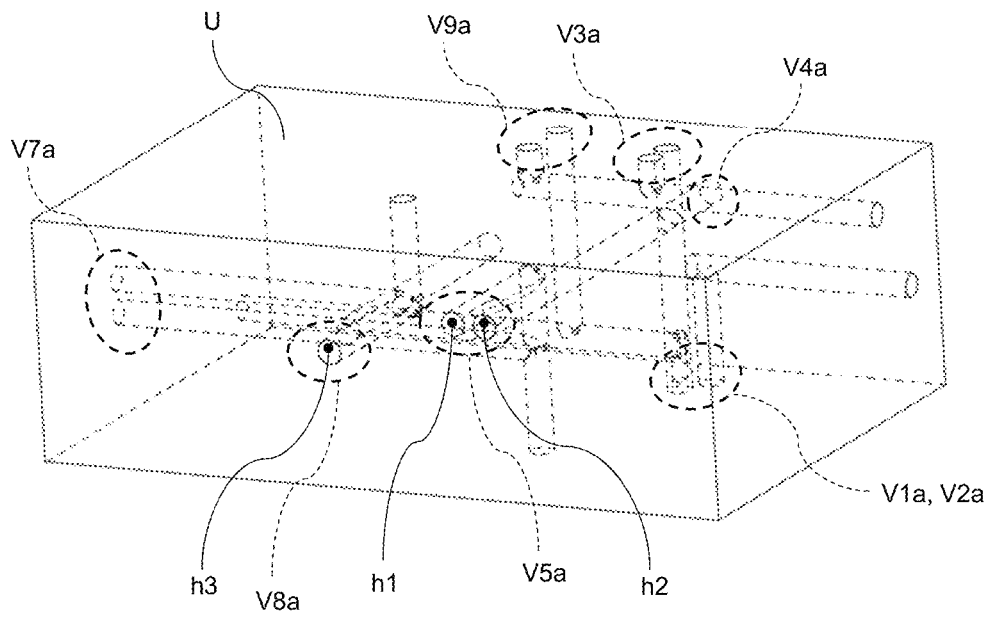
Figure 11:
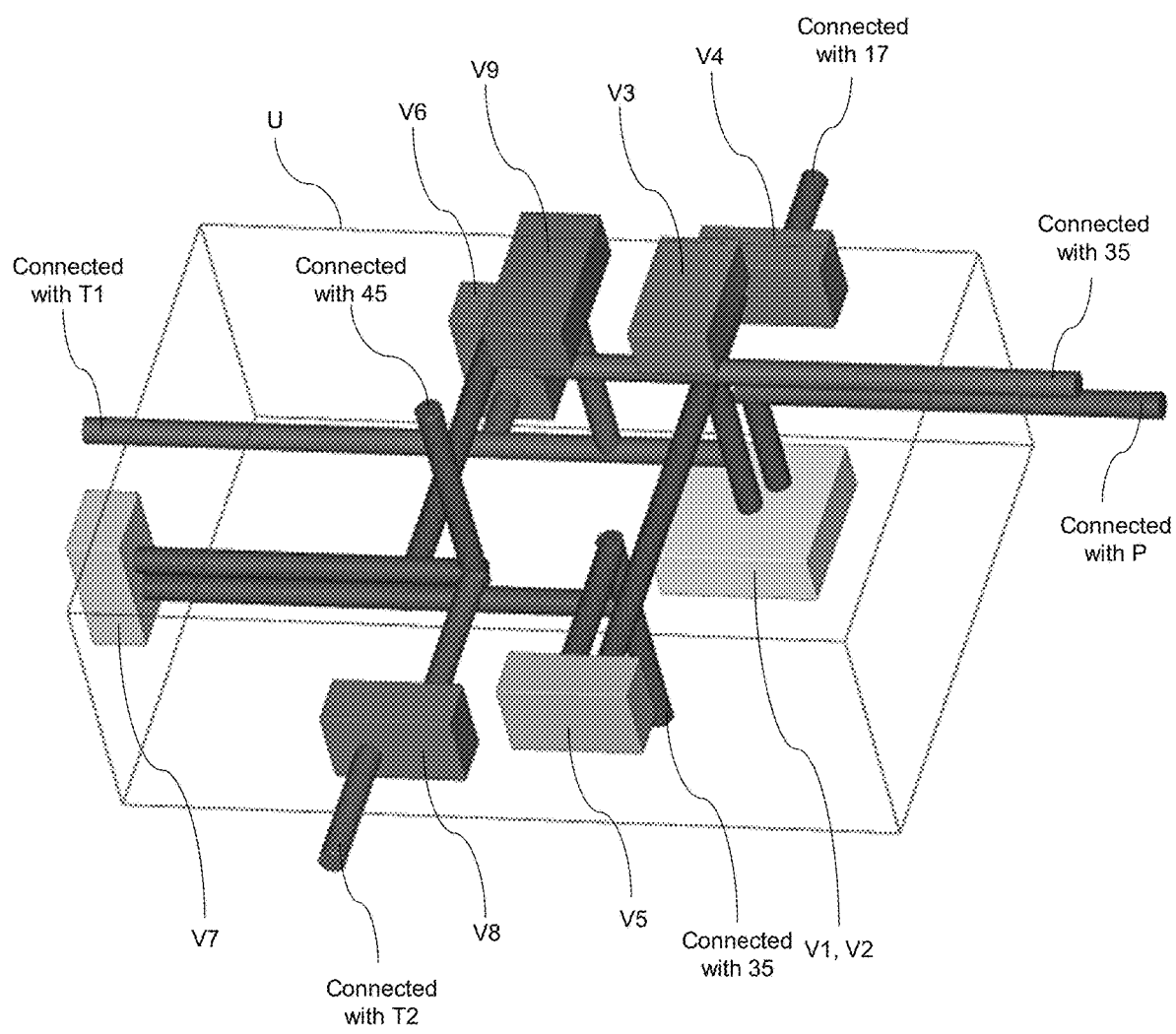
FIG. 11 is a perspective view showing the multi-functional valve unit U according to the first embodiment of the present invention and a part of channels connected thereto.
Figure 12:
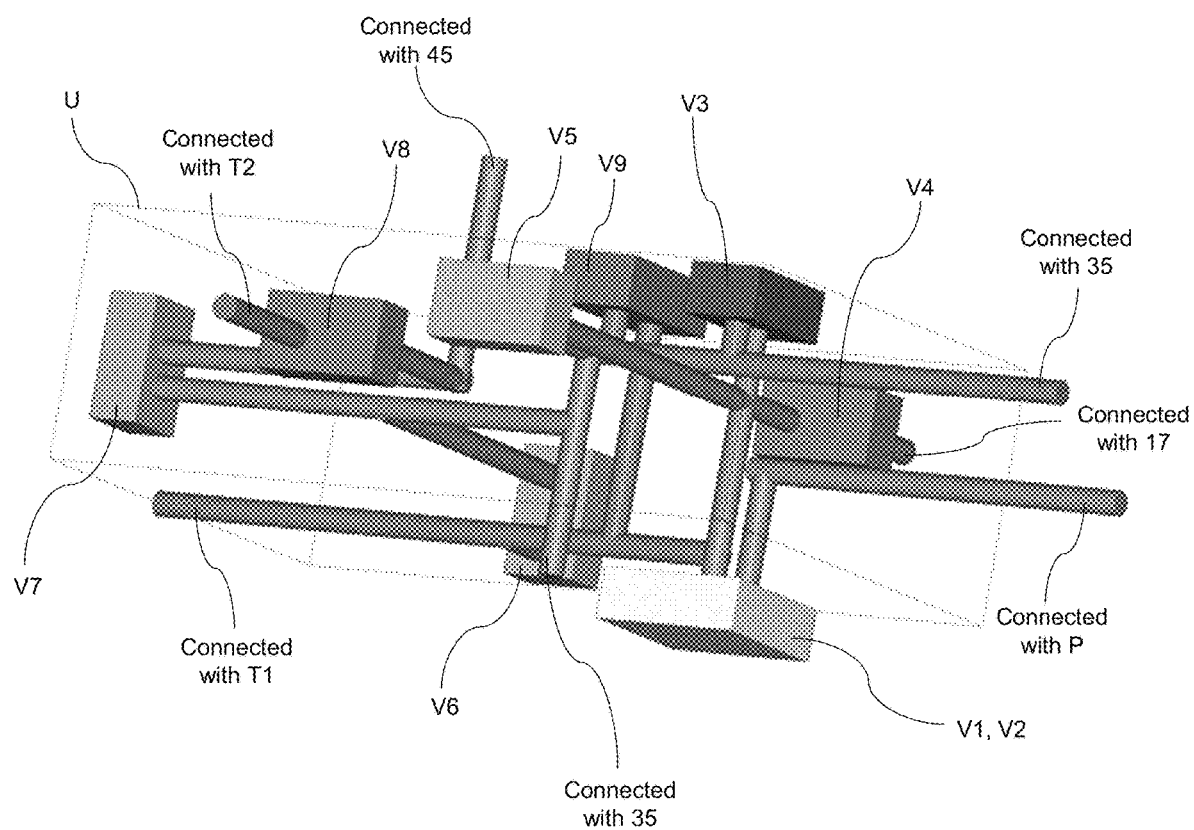
FIG. 12 is another perspective view showing the multi-functional valve unit U according to the first embodiment of the present invention and a part of channels connected thereto.
Figure 13:
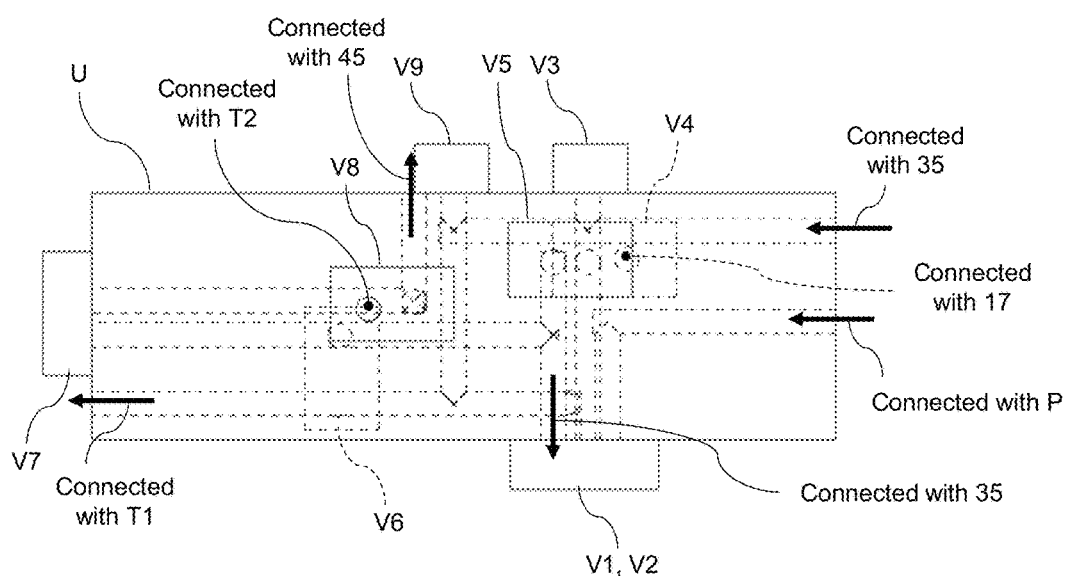
FIG. 13 is a front view of the multi-functional valve unit U according to the first embodiment of the present invention.
Figure 14:
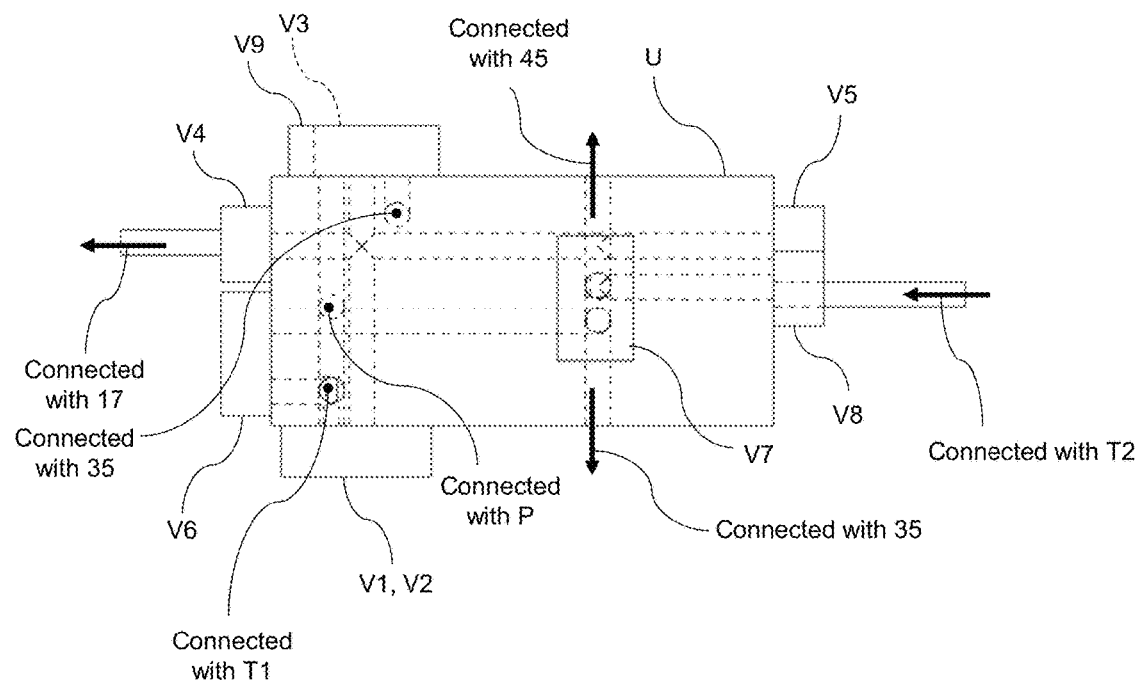
FIG. 14 is a left side view of the multi-functional valve unit U according to the first embodiment of the present invention.
Figure 15:
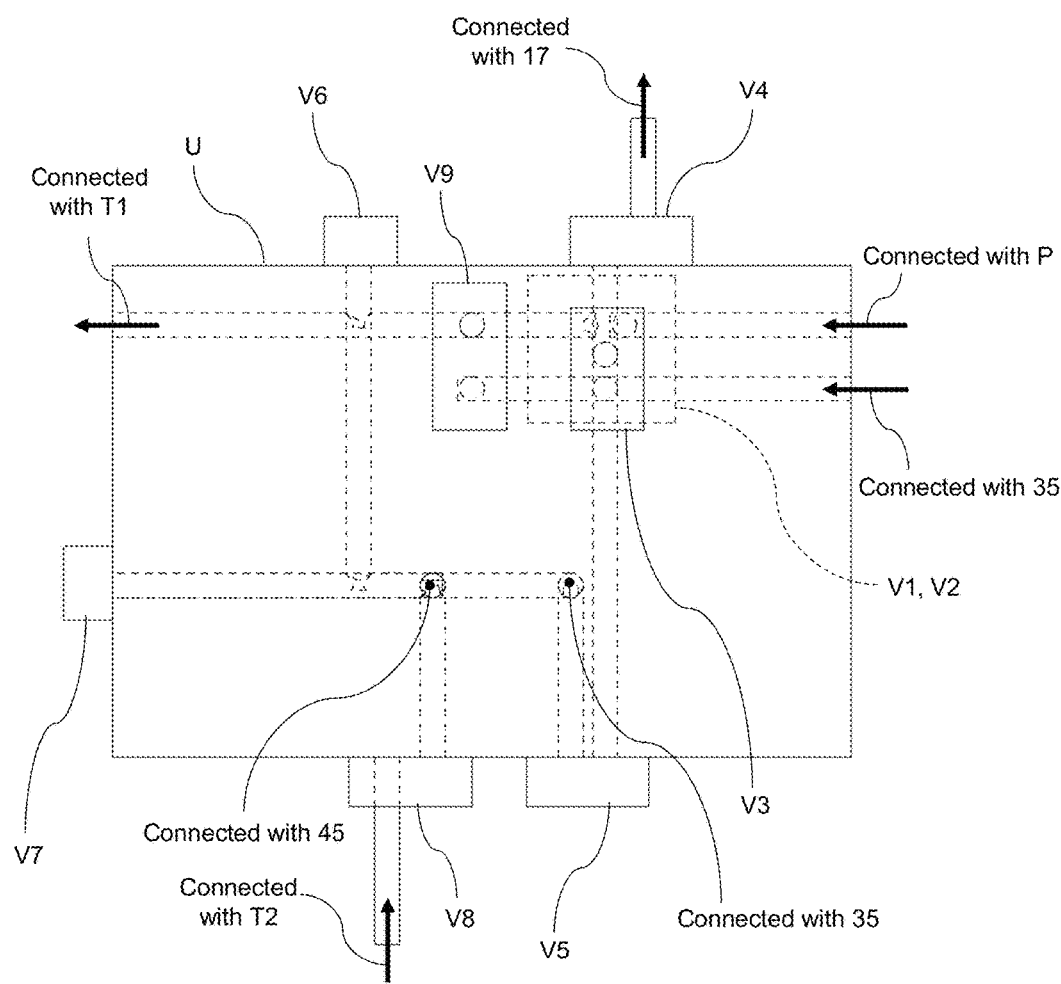
FIG. 15 is a plan view of the multi-functional valve unit U according to the first embodiment of the present invention.

FIGS. 10A and 10B are perspective views of the multi-functional valve unit U (excluding valves thereof) according to the first embodiment of the present invention. Particularly, in FIG. 10B, the inside is shown in a transparent manner. FIG. 11 and FIG. 12 are perspective views showing the multi-functional valve unit U according to the first embodiment of the present invention and a part of channels connected thereto. Further, FIG. 13 to FIG. 15 each are a front view, a left side view, and a plan view of the multi-functional valve unit U according to the first embodiment of the present invention. As shown in the diagrams, the multi-functional valve unit U has a substantially rectangular parallelepiped shape.

A plurality of channels in the multi-functional valve unit U is holes (for example, channel holes h1-h3 shown in FIG. 10A) formed from a surface of the multi-functional valve unit U to the inside. That is, each of the channels is provided so as to extend from any of the surfaces the substantially rectangular parallelepiped of the multi-functional valve unit U toward a vertical direction of the surface. Desired channels can be easily formed with such a configuration.

The flow adjustment valve V1, the pressure adjustment valve V2, and each of the path control valves V3-V9 are provided at valve installation positions V1a-V9a on the surfaces of the substantially rectangular parallelepiped. For example, the logic valves V3, V5, the prefill valve V8, and the relief valve V9 are respectively provided at the valve installation positions V3a, V5a, V8a, V9a on the surfaces shown in FIG. 10A. Further, the channel holes h1, h2 included in the valve installation position V5a can be connected to each other so as to conduct and interrupt the oil via the logic valve V5. The same applies to the valve installation positions V3a, V9a. On the other hand, the channel hole h3 included in the valve installation position V8a can be connected to an external channel outside the multi-functional valve unit U so as to conduct and interrupt the oil via the prefill valve V8. In this regard, in FIG. 11 to FIG. 15, the flow adjustment valve V1 and the pressure adjustment valve V2 are illustrated as an integrated valve. Here, the first embodiment shown in FIG. 10A, FIG. 10B, and FIG. 11 to FIG. 15 is merely an example, and different channel configuration may be adopted for details. Although not shown in these drawings, it is preferable that the pilot channel connected to the logic valves V3-V6, the prefill valve V8, and the relief valve V9 and the solenoid valves for controlling these valves are also arranged in the multi-functional valve unit U.

1.4 Effect

According to the molding machine 1 of the first embodiment, the following effects can be obtained.

(1) The flow adjustment valve V1, the pressure adjustment valve V2, the path control valves V3-V9, and the like are integrally accommodated in the multi-functional valve unit U. The flow adjustment valve V1 and the pressure adjustment valve V2, and the path control valves V3-V9, which have been conventionally provided separately, are accommodated integrally, and thus the space saving and simplification of the hydraulic circuit in the molding machine can be achieved. Consequently, the overall size of the molding machine can be reduced.

(2) The molds 21, 22 are configured to be opened and closed along the direction of the depth d, which is the longitudinal direction of the molding machine 1, and thus space saving can be achieved compared to the case where the molds 21, 22 are configured to be opened and closed along a direction of the width w.

(3) Since any of the channels in the multi-functional valve unit U are provided so as to extend from any of the surfaces of the substantially rectangular parallelepiped of the multi-functional valve unit U along the direction perpendicular to the surface, the multi-functional valve unit U can be produced efficiently at low cost without requiring complicated high-cost processing.

2. Second Embodiment

Next, the second embodiment of the present invention will be described.

2.1 Molding Machine

Figure 16:
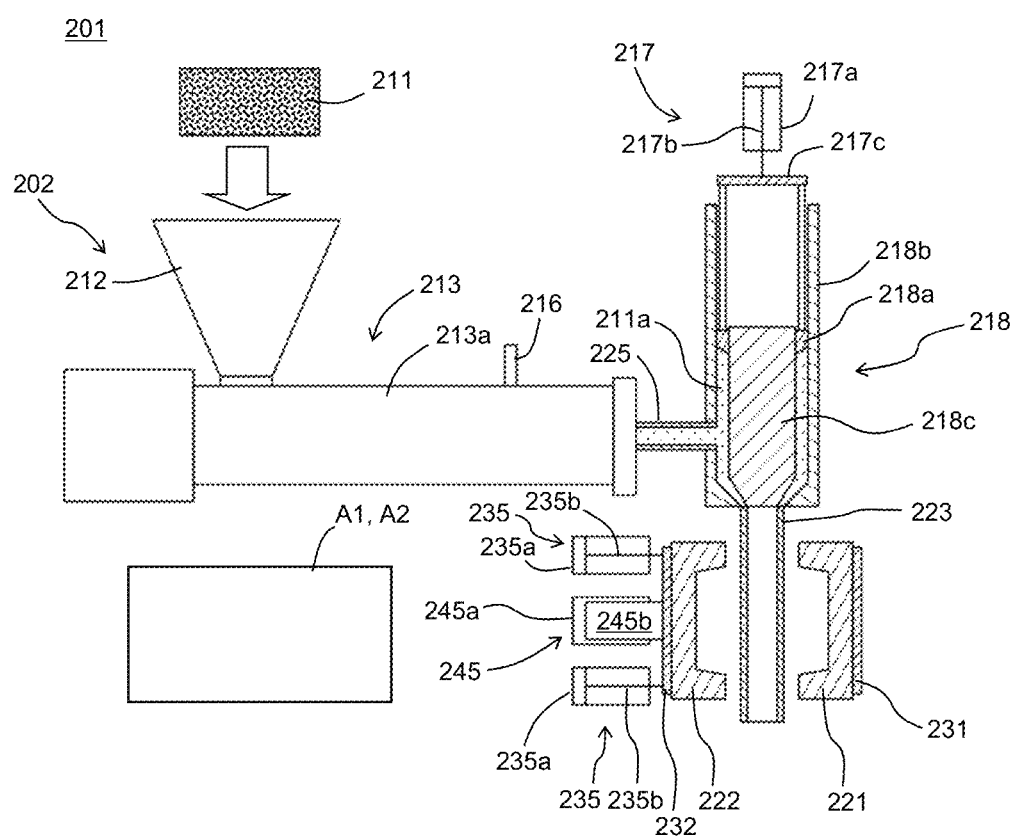
FIG. 16 shows an example of the molding machine 1 that can be used in a method for manufacturing a foam molded body according to a second embodiment of the present invention.

As shown in FIG. 16, a molding machine 201 of the second embodiment of the present invention comprises a resin supply device 202, an injection part 218, first and second platens 231, 232 on which first and second molds 221, 222 are mounted, a hydraulic mechanism for injection 217, a hydraulic mechanism for opening and closing 235, and a hydraulic mechanism for pressure maintenance 245. The resin supply device 202 comprises a hopper 212, an extruder 213, and an injector 216. The extruder 213 and the injection part 218 are connected via a connecting pipe 225. The hydraulic mechanisms 217, 235, 245 are driven by hydraulic pressure generated in a hydraulic circuit C shown in FIG. 17. Two hydraulic mechanisms 235 are provided on a diagonal line of the mold 222, and the hydraulic mechanism 245 is disposed between the two the hydraulic mechanisms 235. The molding machine 201 is preferably a foam molding machine for foam molding.

Hereinafter, each configuration will be described in detail.

<Hopper 212, Extruder 213>

The hopper 212 is used for charging raw resin 211 in a cylinder 213a of the extruder 213. Although the form of the raw resin 211 is not specifically limited, pellet-shaped resin is usually used. The raw resin is, for example, a thermoplastic resin such as polyolefin. Examples of the polyolefin include low-density polyethylene, linear low-density polyethylene, high-density polyethylene, polypropylene, ethylene-propylene copolymer, and a mixture thereof. The raw resin 211 is charged in the cylinder 213a from the hopper 212 and then melted into molten resin by being heated in the cylinder 213a. Further, the raw resin 211 is conveyed toward a front end of the cylinder 213a by rotation of a screw disposed in the cylinder 213a. The screw is disposed in the cylinder 213a and kneads and conveys the molten resin by rotation. A gear device is provided at a base end of the screw, and the screw is driven by the gear device to rotate. The number of the screws disposed in the cylinder 213a may be one or more.

<Injector 216>

The cylinder 213a is provided with the injector 216 for injecting a foaming agent into the cylinder 213a. When it is not necessary to foam the raw resin 211, the injector 216 can be omitted. Examples of the foaming agent injected from the injector 216 include physical foaming agents, chemical foaming agents, and a mixture thereof, and physical foaming agents are preferred. As physical foaming agents, inorganic physical foaming agents, such as air, carbon dioxide gas, nitrogen gas, and water, organic physical foaming agents, such as butane, pentane, hexane, dichloromethane, and dichloroethane, and supercritical fluids of these agents can be used. As the supercritical fluid, it is preferable to use carbon dioxide, nitrogen, or the like. In case of nitrogen, the supercritical fluid can be obtained under conditions of critical temperature at −149.1° C., and critical pressure at 3.4 MPa or higher, and in case of carbon dioxide, under conditions of critical temperature at 31° C., and critical pressure at 7.4 MPa or higher. Examples of the chemical foaming agents include those that generate carbon dioxide as a result of a chemical reaction with an acid (e.g., citric acid or a salt thereof) or a base (e.g., sodium bicarbonate). The chemical foaming agents may be charged from the hopper 212, instead of being injected from the injector 216.

<Injection Part 218>

The molten resin 211a to which the foaming agent is added (foam molten resin) or the molten resin 211a to which no foaming agent is added (solid molten resin) is extruded from a resin extrusion port of the cylinder 213a and injected into the injection part 218 via the connecting pipe 225. The injection part 218 comprises a cylinder 218a, a piston 218b slidable therein, and a mandrel 218c, the cylinder 218a is configured to store the molten resin 211a inside. By moving the piston 218b after a predetermined amount of the molten resin 211a is stored in the cylinder 218a, the molten resin 211a is injected downward from a die slit provided at a tip of the injection part 218 to form a parison 223. The parison 223 has a cylindrical shape in FIG. 16, but is not limited to this example, and may have another shape (for example, a sheet shape). In this regard, the injection part 218 in FIG. 16 is an injection part of an in-die accumulator type provided with an accumulator in a head but may be an injection part of a side accumulator type provided with an accumulator adjacent to the head.

<Hydraulic Mechanism for Injection 217>

One end of the piston 218b is connected to the hydraulic mechanism for injection 217. The injection part 218 is driven by a hydraulic mechanism 217 and injects the molten resin 211a between the molds 221, 222 to form the parison 223. The hydraulic mechanism 217 comprises a cylinder 217a and a piston 217b slidable therein. The piston 217b is connected to the piston 218b via the connecting plate 17c. The piston 217b can be driven by controlling hydraulic pressure in the cylinder 217a. The hydraulic circuit C for driving the piston 217b will be described later.

<First and Second Molds 221, 222>

As shown in FIG. 16, a molded body can be formed by closing, in a state the parison 223 is disposed between the molds 221, 222, the molds 221, 222 and preferably maintaining pressure applied to the molds 221, 222. A molding method using the molds 221, 222 is not specifically limited, may be blow molding in which air is blown into a cavity of the molds 221, 222 for molding, may be vacuum molding in which the inside of the cavity of the molds 221, 222 is decompressed to form a parison, or may be a combination thereof. When the molten resin contains a foaming agent, the parison becomes a foam parison.

<First and Second Platens 231, 232, Hydraulic Mechanism for Opening and Closing 235, Hydraulic Mechanism for Pressure Maintenance 245>

The molds 221, 222 are mounted on the platens 231, 232. The mold 222 is connected to the hydraulic mechanism for opening and closing 235 and the hydraulic mechanism for pressure maintenance 245 via the platen 32. The platens 231, 232 are configured to be driven by the hydraulic mechanism for opening and closing 235 to open and close the molds 221, 222. The hydraulic mechanism for pressure maintenance is configured to maintain pressure applied to the molds 221, 222 in a closed state.

The hydraulic mechanisms 235, 245 comprises cylinders 235a, 245a, respectively, and pistons 235a, 245a slidable therein, respectively. The pistons 235a, 245a can be driven by controlling hydraulic pressure in the cylinders 235a, 245a.

2.2 Configuration of Hydraulic Circuit C

Next, the oil conduction path in the hydraulic circuit C is described for a purpose of each step. The hydraulic circuit C is a circuit that conducts the oil generating hydraulic pressure.

2.2.1 Overall Circuit Diagram

Figure 17:
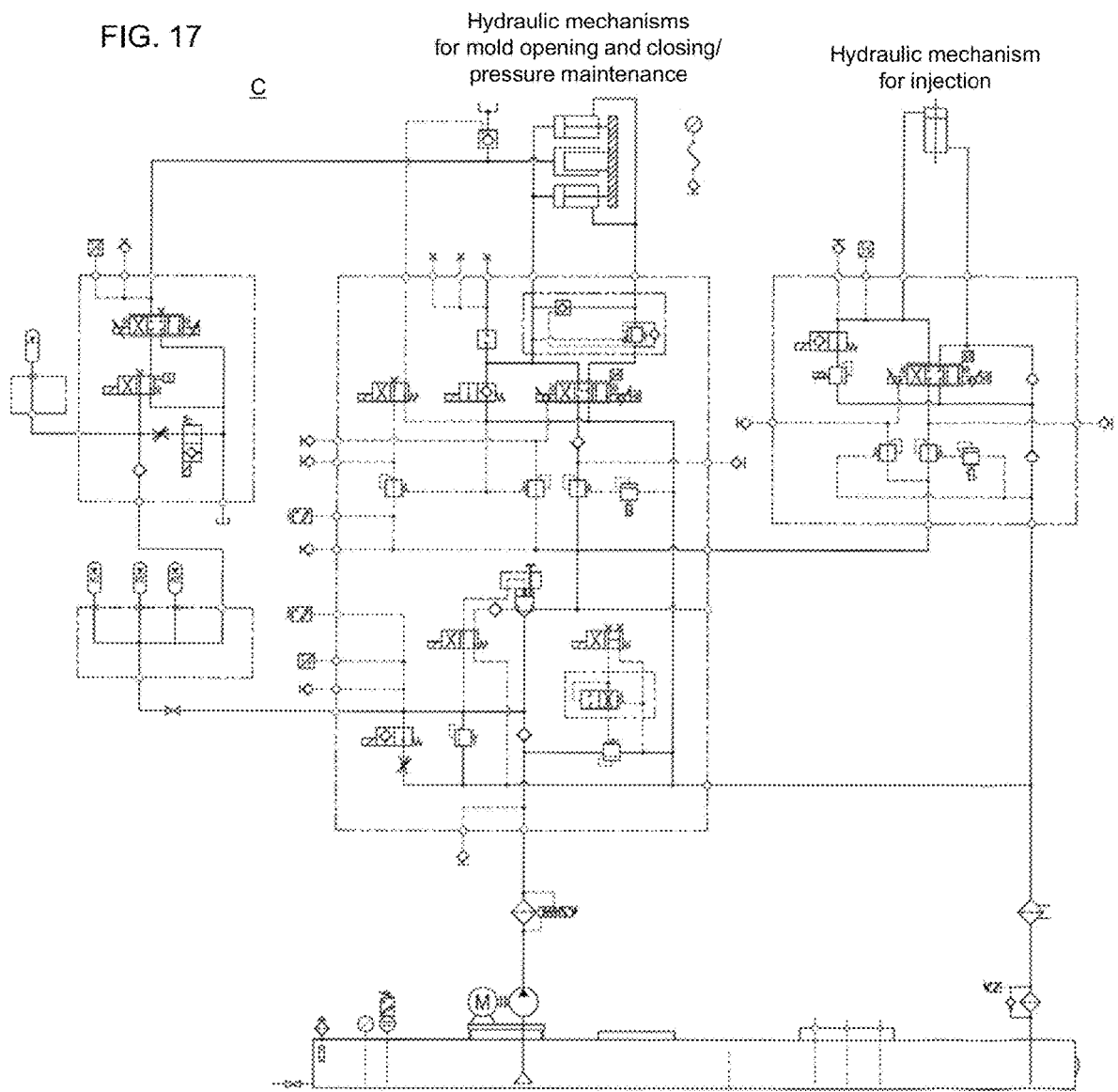
FIG. 17 is an overall circuit diagram of a hydraulic circuit C according to the second embodiment of the present invention.

FIG. 17 is an overall circuit diagram of the hydraulic circuit C according to the second embodiment of the present invention. FIG. 18 to FIG. 23 are circuit diagrams showing the main part of the hydraulic circuit C. The hydraulic circuit C comprises a tank T, a pump P, valves V1-V17, a first accumulator A1, and a second accumulator A2. Each component is connected via a pipe. In the tank T, oil to be sent to the hydraulic circuit C is stored. The pump P is connected to the tank T through the pipe and sucks the oil from the tank T to send the oil to the downstream side. The valve V1 is a logic valve and is opened and closed to control oil conduction. The logic valve can be controlled by a solenoid valve (not shown) to be opened and closed. The valves V2-V7 are check valves that allow fluid to flow only from the upstream ("<" side) to the downstream ("o" side) and prevent the flow from the downstream to the upstream. The valves V8-V13 are direction control valves and electromagnetically control oil flow. The valves V14-V15 are relief valves and release pressure when pressure exceeding a set value is applied. The valves V16-V17 are pressure reducing valves that reduce pressure on the upstream side for transmission to the downstream side. The accumulators A1, A2 have a function of accumulating oil and releasing the accumulated oil as appropriate. Gas is sealed in the accumulators. The oil is accumulated in the accumulators when hydraulic pressure in the pipe to which the accumulators are connected is higher than pressure in the accumulators, and the oil is discharged when the hydraulic pressure is lower than the pressure in the accumulators. As shown in FIG. 16, the accumulators A1, A2 are disposed below the extruder 213 and on a back side of the hydraulic mechanism 235. Although the accumulators A1, A2 are usually large in size, such an arrangement allows the accumulators A1, A2 to be installed without increasing installation space of the molding machine 201. Further, the accumulator A1 is divided into a plurality of parts. Each part of the accumulator A1 is connected to a pipe in parallel. Consequently, the operation of the molding machine 201 can be continued even if one of the parts of the accumulator A1 fails to operate properly.

2.2.2 Oil Conduction Path

In the molding machine 201, an oil accumulation step, a step of injecting the molten resin 211a, a step of closing the molds 221, 222, a step of maintaining pressure applied to the molds 221, 222, a step of opening the molds 221, 222, and a step of injecting molten resin to the injection part 218 are performed. The oil conduction path in each step is described below.

<Oil Accumulation Step>

Figure 18:
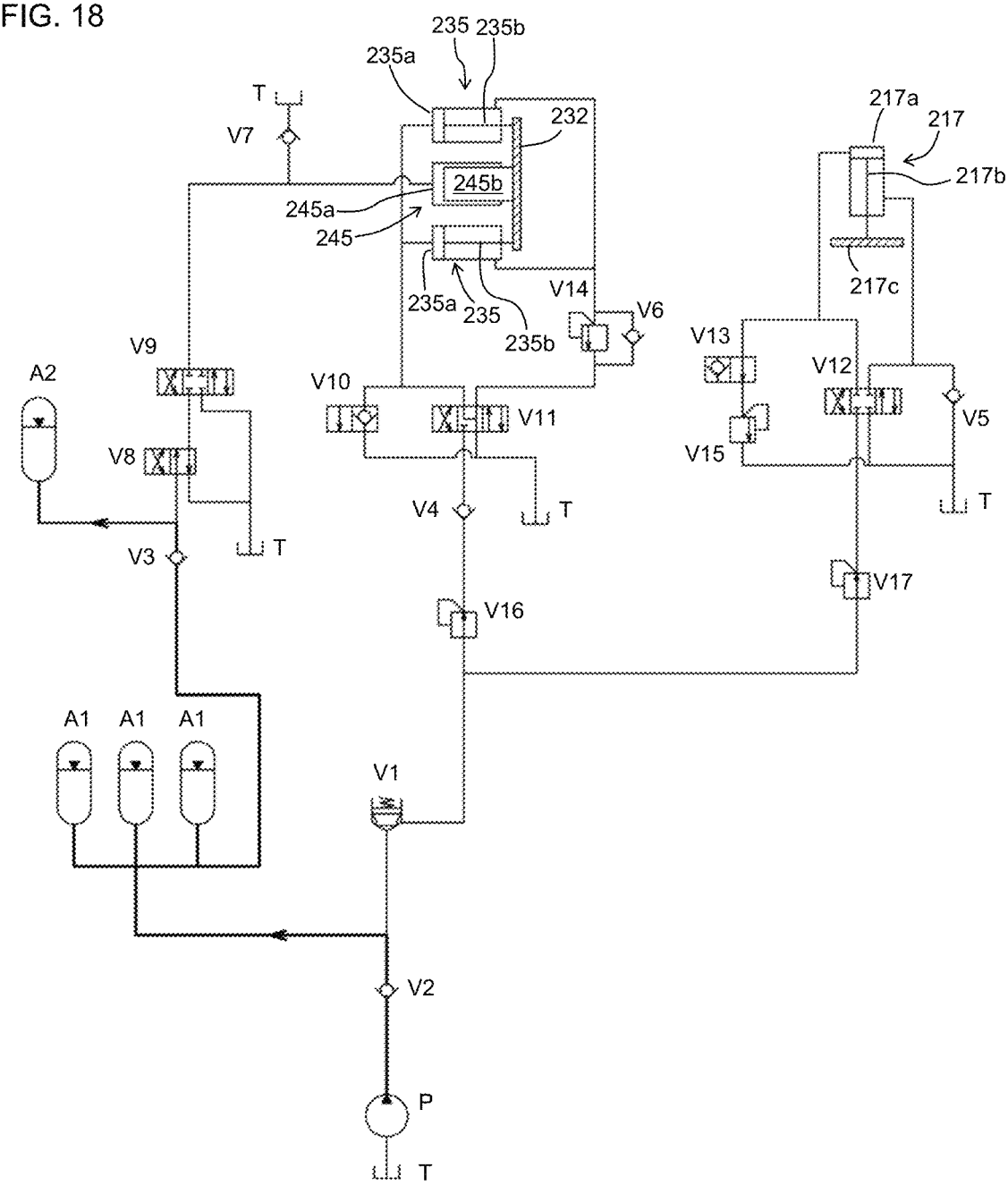
FIG. 18 is a schematic view of the main part of the hydraulic circuit C and shows the oil conduction path when oil is accumulated in accumulators A1, A2.

FIG. 18 shows the oil conduction path when oil is accumulated in accumulators A1, A2. The valves V1, V8 are closed. The oil delivered from the pump P is accumulated in the accumulator A1 through the valve V2 and further accumulated in the accumulator A2 through the valve V3.

<Step of Injecting Molten Resin 211a>

Figure 19:
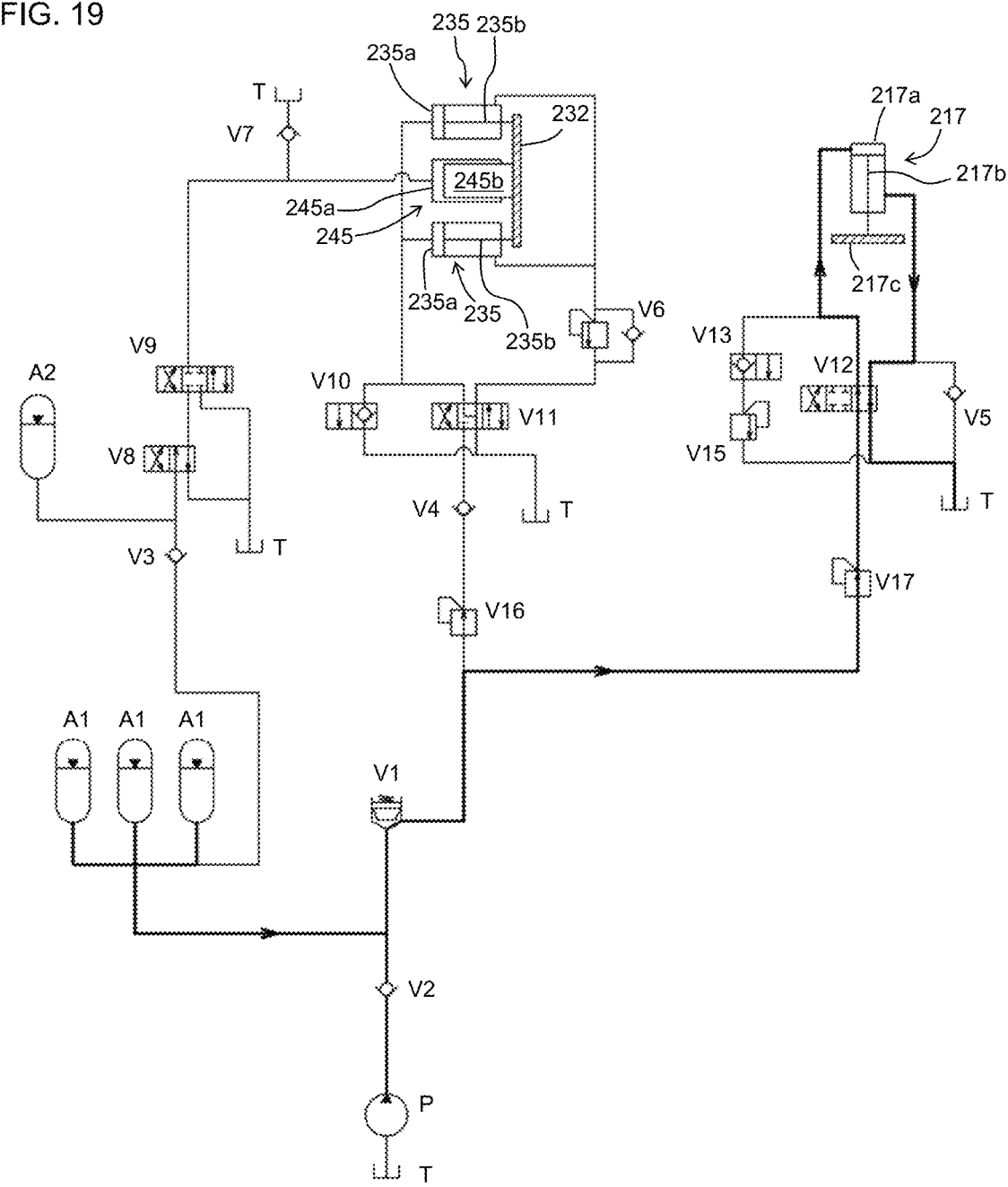
FIG. 19 is a schematic view of the main part of the hydraulic circuit C and shows the oil conduction path when the molten resin 211a is injected.

FIG. 19 shows the oil conduction path when the molten resin 211a is injected. The valves V8, V11, V13 are closed, and the valves V1, V12 are opened.

When the valve V1 is opened from the state of FIG. 18, the oil in the accumulator A1 is discharged into the pipe, passes through the valve V1, is decompressed by the valve V17, passes through the valve 12, and is then injected to a back side of the piston 217b in the cylinder 217a. Consequently, the piston 217b is pushed out (moves so as to increase the protruding amount from the cylinder). When the piston 217b is pushed out, the oil on a front side of the piston 217b in the cylinder 217a is pushed out and returned to the tank T through the valve V12. When the piston 217b is pushed out, the piston 218b shown in FIG. 16 is pushed down, and the molten resin 211a in the cylinder 218a of the injection part 218 is injected to form the parison 223.

Since the accumulator A1 can discharge oil at high speed, the molten resin 211a can be injected at high speed by driving the hydraulic mechanism 217 by hydraulic pressure generated by the oil discharged from the accumulator A1, even when the capacity of the pump P is small. In addition, when the molten resin 211a is foam molten resin, the growth of bubbles and bubble breakage are suppressed.

In this step, the oil discharged from the accumulator A1 is not supplied to the cylinders 235a, 245a, and is supplied only to the cylinder 217a. When this oil is supplied to the cylinders 235a, 245a, the injection may become unstable, while the injection is stabilized at high speed by supplying this oil only to the cylinder 217a.

In the description of this step and the steps described below, the description of the pump P is omitted as appropriate. The pump P is operated as appropriate to supply oil into the pipe to generate hydraulic pressure. For example, the pump P can be controlled to operate when the amount of oil accumulated in the accumulators decreases. In this case, since the pump P is not always operated, energy consumption can be reduced.

<Step of Closing Molds 221, 222>

Figure 20:
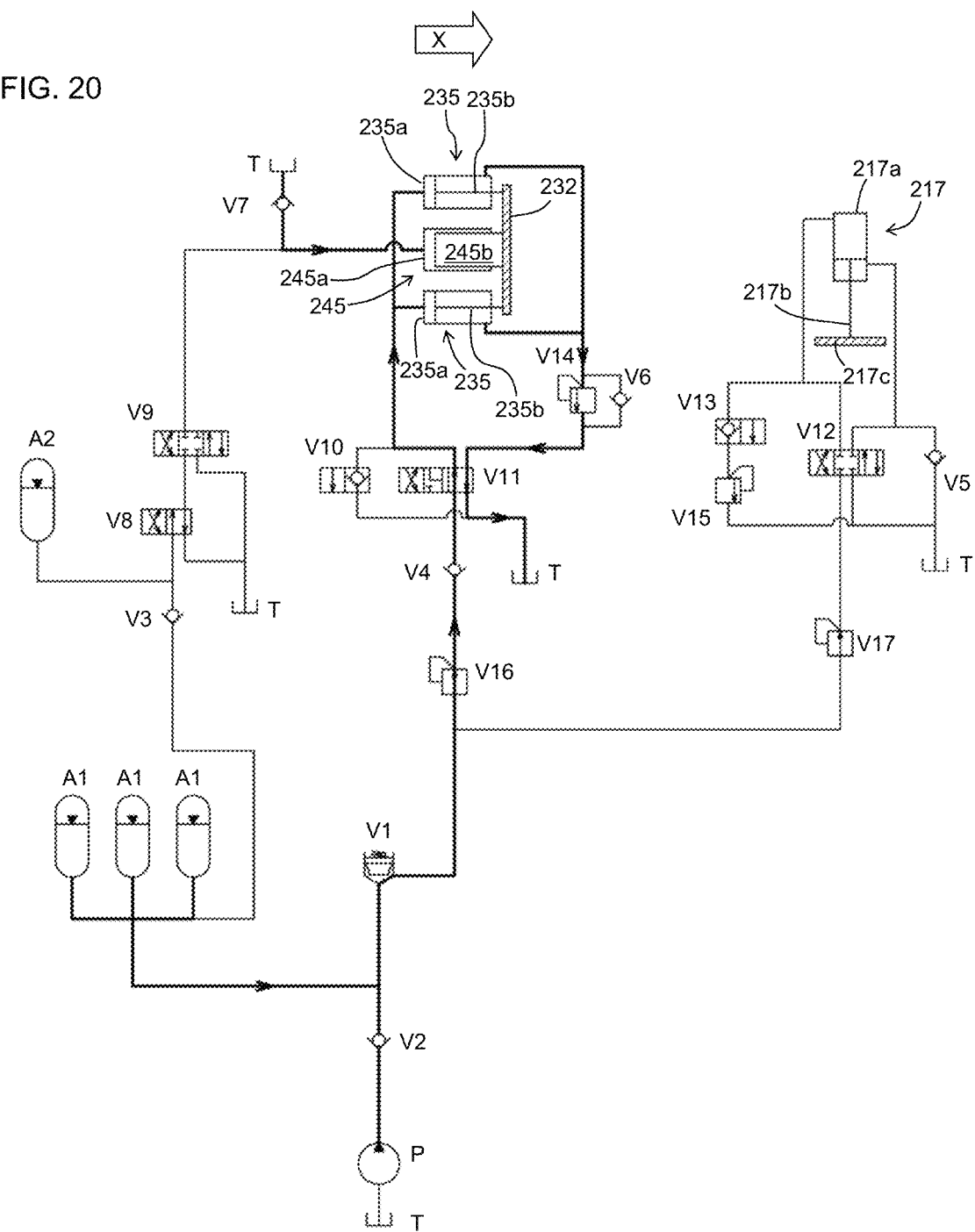
FIG. 20 is a schematic view of the main part of the hydraulic circuit C and shows the oil conduction path when the molds 221, 222 are closed.

FIG. 20 shows the oil conduction path when the molds 221, 222 are closed. The valves V8, V10, V12 are closed, and the valves V1, V11, V14 are opened.

When the valve V12 is closed and the valve V11 is opened from the state of FIG. 19, the oil in the accumulator A1 is discharged into the pipe, passes through the valve V1, is decompressed by the valve V16, passes through the valve V11, and is then injected to a back side of the piston 235a in the cylinder 235a. Consequently, the piston 235a is pushed out (moves in the mold closing direction (the direction of the arrow X) of the molds 221 and 222). When the piston 235a is pushed out, the oil on a front side of the piston 235a in the cylinder 235a is pushed out and returned to the tank T through the valves V14, V11.

Further, the cylinder 245a of the hydraulic mechanism 245 is connected to the tank T via the valve V7. When the mold plate 32 moves in the direction of the arrow X with the movement of the piston 235a, the piston 245a also moves in the direction of the arrow X. Along with this movement, oil from the tank T is sucked into the cylinder 245a. The cylinder 245a of the hydraulic mechanism 245 has a large capacity. Therefore, if the cylinder 245a is configured so that the oil from the accumulator A1 is injected into the cylinder 245a, the accumulator A1 is enlarged accordingly. On the other hand, in the second embodiment, the oil from the tank T is passively injected in the cylinder 245a with the movement of the piston 235a, and thus the enlargement of the accumulator A1 is suppressed.

Since the accumulator A1 can discharge oil at higher speed than the pump P, the molds 221, 222 can be closed at high speed by driving the hydraulic mechanism 235 by the hydraulic pressure generated by the oil discharged from the accumulator A1. In addition, when the molten resin 211a is foam molten resin, the growth of bubbles and bubble breakage are suppressed.

In this step, the oil discharged from the accumulator A1 is not supplied to the cylinders 217a, 245a, and is supplied only to the cylinder 235a. When this oil is supplied to the cylinders 217a, 245a, the mold closing may become unstable, while the mold closing is stabilized at high speed by supplying this oil only to the cylinder 235a.

In this way, the oil from the accumulator A1 is supplied only to the cylinder 217a in the step of injecting the molten resin 211a and is supplied only to the cylinder 235a in the step of closing the molds 221, 222. Consequently, the hydraulic mechanisms 217, 235 are sequentially driven. The operation is stabilized by supplying the oil to the cylinders 217a, 235a sequentially rather than simultaneously.

In addition, since the hydraulic mechanisms 217, 235 are driven by the common accumulator A1, installation space can be reduced as compared with the case where a dedicated accumulator is provided for each mechanism.

<Step of Maintaining Pressure Applied to Molds 221, 222>

Figure 21:
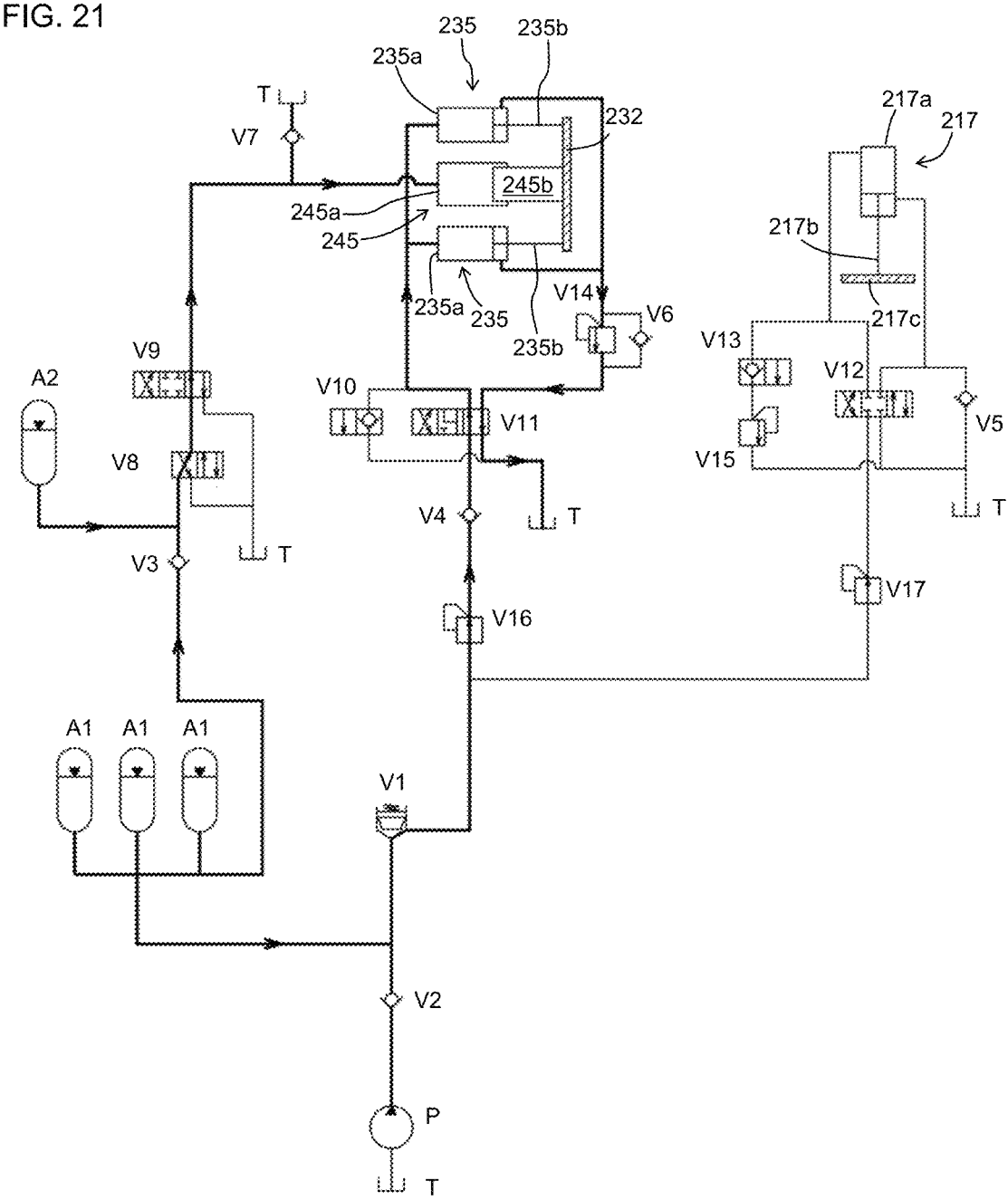
FIG. 21 is a schematic view of the main part of the hydraulic circuit C and shows the oil conduction path when pressure applied to the molds 221, 222 is maintained (mold clamping).

After the molds 221, 222 come into contact with each other (mold closing), a step is performed for further applying pressure in a direction of closing the molds. This step is referred to as a pressure maintenance. FIG. 21 shows the oil conduction path when pressure applied to the molds 21, 22 is maintained (mold clamping). The valves V10, V12 are closed, and the valves V1, V8, V9, V11, V14 are opened.

When the valves V8, V9 are opened from the state of FIG. 20, the oil in the accumulator A2 is discharged into the pipe, passes through the valves V8, V9, and is injected to a back side of the piston 245a in the cylinder 245a. Consequently, pressure is applied to the piston 245a, and the pressure is maintained with the molds 221, 222 closed.

The oil discharged from the accumulator A2 is not supplied to the cylinders 217a, 235a and is supplied only to the cylinder 245a. The hydraulic pressure generated by the oil discharged from the accumulator decreases with a decrease in the internal pressure of the accumulator accompanying the oil discharge. However, by supplying the oil discharged from the accumulator A2 only to the cylinder 245a, a high hydraulic pressure can be applied to the piston 245a.

When the pressure maintenance step is started after the molds 221, 222 come into contact, the hydraulic pressure is applied to the piston 245a, while the oil hardly flows. On the other hand, the oil from the accumulator A2 can be injected into the cylinder 245a by opening the valves V8, V9 before the molds 221, 222 come into contact. In this case, the oil flows through the conduction path shown in FIG. 21 until the molds 221, 222 are closed, and the oil flow is stopped when the molds 221, 222 are closed.

<Step of Opening Molds 221, 222>

Figure 22:
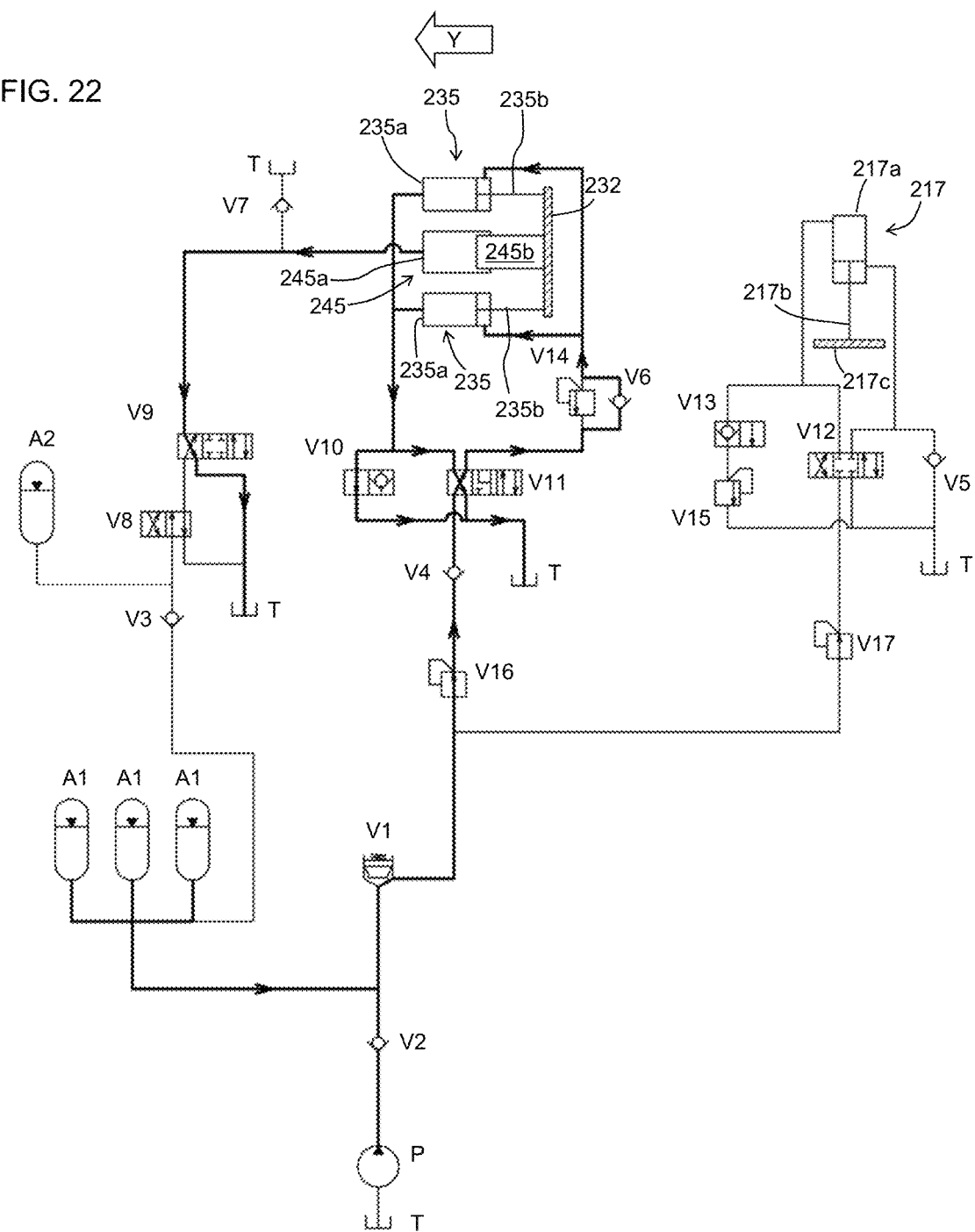
FIG. 22 is a schematic view of the main part of the hydraulic circuit C and shows the oil conduction path when the molds 221, 222 are opened.

FIG. 22 shows the oil conduction path when the molds 221, 222 are opened. The valve V12 are closed, and the valves V1, V9, V11, V14 are opened. The paths of the valves V9, V11 are switched from those in the step of maintaining pressure applied to the molds 221, 222. That is, pipes at both ends of the valves V9, V11 are connected in parallel in the step of maintaining pressure applied to the molds 221, 222, while the pipes at both ends are crossed and connected in the step of opening the molds 221, 222.

When the valve V10 is opened from the state of FIG. 21 and the paths of the valves V9, V11 are switched, the oil in the accumulator A1 passes through the valve V1, is decompressed by the valve V16, passes through the valves V11, V6, and is injected into the front side of the piston 235a in the cylinder 235a. Consequently, the piston 235a is pushed in (moves in the mold opening direction (the direction of the arrow Y) of the molds 221 and 222). When the piston 235a is pushed in, the oil on the back side of the piston 235a in the cylinder 235a is pushed out and returned to the tank T through the valve V10 and the valve V11.

Further, when the mold plate 32 moves in the direction of the arrow Y as the piston 235a moves, the piston 245a also moves in the direction of the arrow Y. Along with this movement, the oil in the cylinder 245a is returned to the tank T through the valve V9.

<Step of Molten Resin Injection to Injection Part 218>

FIG. 23 shows the oil conduction path when the molten resin is injected into the injection part 218. The valve V12 is closed, and the valves V13, V15 are opened. When the extruder 213 is operated to inject the molten resin 211a into the injection part 218, the piston 218b is pushed up by the pressure of the molten resin 211a. When the piston 218b is pushed up, the piston 217b is pushed into the cylinder 217a. Then, the oil on a back side of the piston 217b in the cylinder 217a is pushed out and moves to a front side of the piston 217b in the cylinder 217a through the valves V13, V15, V5. The pressure in the pipe from the back side to the front side of the piston 217b in the cylinder 217a is regulated by the valve (back-pressure adjustment valve) 15, and thereby the pressure (back pressure) on the back side of the piston 217b is adjusted.

When the molten resin 211a is foam molten resin, bubbles grow in the injection part 218 under law back pressure of the piston 217b, and bubble breakage easily occurs. Therefore, in the second embodiment, the bubble breakage is suppressed by adjusting the back pressure of the piston 217b by the valve V15 to continuously apply an appropriate pressure to the molten resin 211a in the injection part 218.

Since the pump P is being operated during this step and the valves V1 and V8 are closed, the oil is accumulated in the accumulators A1 and A2 as in the oil accumulation step described above. That is, the oil accumulation step and the step of injecting molten resin to the injection part 218 can be performed simultaneously.

2.3 Manufacturing Method of Foam Molded Body

The molding machine 201 can perform injection and mold closing at high speed. When used in manufacturing a foam molded body, the molding machine 201 can suppress bubble breakage and increase the expansion ratio of the foam molded body.

The manufacturing method of foam molded body according to the second embodiment comprises an injection step, a mold closing step, and a pressure maintenance step. The pressure maintenance step can be omitted.

In the injection step, a foam parison is formed by being driven by the hydraulic mechanism 217 and injecting a foam molten resin between the molds 221, 222. In the mold closing step, the molds 221, 222 are closed by being driven by the hydraulic mechanism 235. In this step, a foam molded body can be formed by molding the foam parison with the molds 221, 222. The hydraulic mechanisms 217, 235 are sequentially driven by the hydraulic pressure generated by the oil discharged from the accumulator A1. Such a configuration makes it possible to perform the injection and the mold closing stably and at high speed.

In the pressure maintenance step, the pressure applied to the molds 221, 222 in a closed state is maintained by the hydraulic mechanism 245. Consequently, welding of the foam molded body at a parting line is strengthened. The hydraulic mechanism 245 is driven by the hydraulic pressure generated by the oil discharged from the accumulator A2. Such a configuration makes it possible to maintain the pressure with a strong hydraulic pressure.

3. Conclusion

As described above, according to the first embodiment, provided is the molding machine 1 configured to achieve the space saving and simplification of the hydraulic circuit. According to the second embodiment, provided is the molding machine 201 capable of increasing the foaming ratio of the foam molded body.

Although the embodiment according to the present invention has been described, these are presented as examples and are not intended to limit the scope of the invention. The novel embodiments can be implemented in various other forms, and various omissions, replacements, and changes can be made without departing from the spirit of the invention. The embodiments and the modifications thereof are included in the scope and gist of the invention and are included in the invention described in the claims and the equivalents thereof.

REFERENCE SIGN LIST

1: molding machine, 2: upper stage, 3: lower stage, 5: resin supply device, 11: raw resin, 11a: molten resin, 12: hopper, 13: extruder, 13a: cylinder, 17: hydraulic mechanism for injection, 17a: cylinder, 17b: piston, 17c: connecting plate, 18: injection part, 18a: cylinder, 18b: piston, 18c: mandrel, 21: first mold, 22: second mold, 23: parison, 25: connecting pipe, 30: mold opening/closing and pressure maintenance device, 31: first mold plate, 32: second mold plate, 33: pressure receiving plate, 34: tie bar, 35: hydraulic mechanism for mold opening and closing, 35a: cylinder, 35a: piston, 41: pipe, 45: hydraulic mechanism for pressure maintenance, 45a: cylinder, 45a: piston, B: return position, P: pump, T1: tank, T2: tank, U: multi-functional valve unit, V1: the flow adjustment valve, V1a: valve installation position, V2: pressure adjustment valve, V3: logic valve (path control valve), V3a: valve installation position, V4: logic valve (path control valve), V5: logic valve (path control valve), V5a: valve installation position, V6: logic valve (path control valve), V7: solenoid valve (path control valve), V8: prefill valve (path control valve), V8a: valve installation position, V9: the relief valve (path control valve), h1: channel hole, h2: channel hole, h3: channel hole, 201: molding machine, 202: resin supply device, 211: raw resin, 211a: molten resin, 212: hopper, 213: extruder, 213a: cylinder, 216: injector, 217: hydraulic mechanism for injection, 217a: cylinder, 217b: piston, 217c: connecting plate, 218: injection part, 218a: cylinder, 218b: piston, 218c: mandrel, 221: first mold, 222: second mold, 223: parison, 225: connecting pipe, 231: first platen, 232: second platen, 235: hydraulic mechanism for opening and closing, 235a: cylinder, 235a: piston, 245: hydraulic mechanism for pressure maintenance, 245a: cylinder, 245a: piston, A1: first accumulator, A2: second accumulator

The invention claimed is:

1. A molding machine configured to form a molded body by closing first and second molds in a state where a parison is disposed by injecting molten resin between the first and second molds capable of being opened and closed, and then maintaining pressure applied to the first and second molds, comprising:
   a hydraulic circuit to conduct oil for generating hydraulic pressure;
   a flow adjustment valve, a pressure adjustment valve, and a path control valve included in the hydraulic circuit; and
   a multi-functional valve unit,
   wherein at least hydraulic mechanisms injecting the molten resin, opening and closing the molds, and maintaining the pressure applied to the first and second molds are driven by the hydraulic pressure generated by the oil sucked out and conducted to a downstream side from a tank storing the oil using a same pump;
   the flow adjustment valve adjusts a flow rate of the oil;
   the pressure adjustment valve adjusts the hydraulic pressure;
   the path control valve determines a conduction path of the oil in the hydraulic circuit; and
   the multi-functional valve unit integrally comprises the flow adjustment valve, the pressure adjustment valve, and the path control valve.

2. The molding machine of claim 1,
   wherein the pump, the multi-functional valve unit, and the hydraulic mechanisms are arranged from an upstream side to a downstream side in the hydraulic circuit; and
   La>Lb, where La is an average value of path lengths between the multi-functional valve unit and the hydraulic mechanisms in the hydraulic circuit, and Lb is a path length between the pump and the multi-functional valve unit in the hydraulic circuit.

3. The molding machine of claim 1,
wherein the multi-functional valve unit has a substantially rectangular parallelepiped shape; and
the flow adjustment valve, the pressure adjustment valve, and the path control valve are provided on a surface of the substantially rectangular parallelepiped shape.

4. The molding machine of claim 3,
wherein a plurality of channels in the multi-functional valve unit is provided so as to extend from a surface of the substantially rectangular parallelepiped shape along a direction perpendicular to the surface.

5. The molding machine of claim 1, configured to have two stages and comprising a resin supply device for injecting the resin,
wherein the resin supply device comprises an extruder for melting and kneading raw resin into molten resin;
the first and second molds and the multi-functional valve unit are provided in a lower stage;
the resin supply device is provided in an upper stage;
the first and second molds and the multi-functional valve unit are disposed along a longitudinal direction of the extruder; and
the first and second molds are opened and closed along the longitudinal direction of the extruder.

6. A molding machine comprising:
a hydraulic circuit; a hydraulic mechanism for injection; a hydraulic mechanism for opening and closing; an injection part; and first and second platens on which first and second molds are mounted,
wherein the hydraulic circuit conducts oil for generating hydraulic pressure;
the hydraulic mechanism for injection and the hydraulic mechanism for opening and closing are driven by hydraulic pressure;
the injection part is driven by the hydraulic mechanism for injection to inject molten resin between the first and second molds to form a parison;
the first and second platens are configured to be driven by the hydraulic mechanism for opening and closing and open and close the first and second molds;
the hydraulic circuit comprises a first accumulator for accumulating oil;
the hydraulic mechanism for injection and the hydraulic mechanism for opening and closing are sequentially driven by hydraulic pressure generated by the oil discharged from the first accumulator; and
the hydraulic circuit is configured to stop supplying the oil to the hydraulic mechanism for opening and closing from the first accumulator when the hydraulic mechanism for injection is driven by the hydraulic pressure and to stop supplying the oil to the hydraulic mechanism for injection from the first accumulator when the hydraulic mechanism for opening and closing is driven by the hydraulic pressure.

7. The molding machine of claim 6,
wherein the first accumulator is divided into a plurality of parts.

8. The molding machine of claim 6, comprising a hydraulic mechanism for pressure maintenance,
wherein the hydraulic mechanism for pressure maintenance is driven by hydraulic pressure;
the hydraulic mechanism for pressure maintenance is configured to maintain pressure applied to the first and second molds in a closed state;
the hydraulic circuit comprises a second accumulator for storing oil; and
the hydraulic mechanism for pressure maintenance is driven by hydraulic pressure generated by the oil discharged from the second accumulator.

9. The molding machine of claim 8,
wherein the hydraulic pressure generated by the oil discharged from the second accumulator does not drive the hydraulic mechanism for opening and closing and the hydraulic mechanism for injection.

10. The molding machine of claim 6, comprising a back-pressure adjustment valve for adjusting back pressure in the hydraulic mechanism for injection when molten resin is injected into the injection part.

11. The molding machine of claim 6, comprising an extruder for melting raw resin into molten resin,
wherein the first accumulator is disposed below the extruder and on a back side of the hydraulic mechanism for opening and closing.

12. A method for manufacturing a foam molded body by means of the molding machine of claim 6, comprising:
an injection step of injecting, by being driven by the hydraulic mechanism for injection, a foam molten resin between the first and second molds to form a foam parison; and
a mold closing step of closing the first and second molds by being driven by the hydraulic mechanism for opening and closing,
wherein the hydraulic mechanism for injection and the hydraulic mechanism for opening and closing are sequentially driven by hydraulic pressure generated by the oil discharged from the first accumulator.

13. The method of claim 12, comprising a pressure maintenance step of maintaining pressure applied to the first and second molds in a closed state by a hydraulic mechanism for pressure maintenance,
wherein the hydraulic mechanism for pressure maintenance is driven by hydraulic pressure generated by oil discharged from a second accumulator.

* * * * *